United States Patent
Nakabo

(10) Patent No.: US 10,410,395 B2
(45) Date of Patent: Sep. 10, 2019

(54) METHOD FOR COMMUNICATING VIA VIRTUAL SPACE AND SYSTEM FOR EXECUTING THE METHOD

(71) Applicant: COLOPL, Inc., Tokyo (JP)

(72) Inventor: Takashi Nakabo, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/870,710

(22) Filed: Jan. 12, 2018

(65) Prior Publication Data
US 2018/0204369 A1 Jul. 19, 2018

(30) Foreign Application Priority Data

Jan. 16, 2017 (JP) .................................. 2017-005154

(51) Int. Cl.
| | | |
|---|---|---|
| G06T 13/40 | (2011.01) | |
| G06F 3/01 | (2006.01) | |
| G02B 27/01 | (2006.01) | |
| G06F 3/0346 | (2013.01) | |

(52) U.S. Cl.
CPC ............ *G06T 13/40* (2013.01); *G02B 27/017* (2013.01); *G06F 3/011* (2013.01); *G06F 3/012* (2013.01); *G06F 3/014* (2013.01); *G06F 3/0346* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 2012/0002822 A1 | 1/2012 | Peissig et al. | |
| 2014/0022249 A1* | 1/2014 | Ye | G06T 13/40 |
| | | | 345/420 |
| 2014/0375635 A1 | 12/2014 | Johnson et al. | |
| 2016/0314801 A1 | 10/2016 | Shioda et al. | |

FOREIGN PATENT DOCUMENTS

| | | |
|---|---|---|
| JP | 2012-514392 A | 6/2012 |
| JP | 2014-61420 A | 4/2014 |
| JP | 2015-15021 A | 1/2015 |
| JP | 2016-126500 A | 7/2016 |

(Continued)

OTHER PUBLICATIONS

Translation of ids cited foreign application JP2016-126500.*

(Continued)

*Primary Examiner* — Peter Hoang
(74) *Attorney, Agent, or Firm* — Hauptman Ham, LLP

(57) ABSTRACT

A method includes defining a virtual space associated with a user. The virtual space includes an avatar object associated with the user, the avatar object comprising a head and a body. The method further includes acquiring, in response to a detected rotation of a head of the user, information representing an angular velocity of the detected rotation. The method further includes determining whether the angular velocity is equal to or greater than a threshold value. The method further includes rotating, in response to a determination that the angular velocity is equal to or greater than the threshold value, the head of the avatar object without rotating the body of the avatar object.

20 Claims, 25 Drawing Sheets

(56) References Cited

FOREIGN PATENT DOCUMENTS

| | | |
|---|---|---|
| JP | 2016-206461 A | 12/2016 |
| JP | 2017-72194 A | 4/2017 |

OTHER PUBLICATIONS

O. Schreer et al.; Real-time avatar animation steered by live body motion; in: Proceedings of the 13th International Conference on Image Analysis and Processing, Cagliari, Italy, 2005; pp. 1-8.*

Treebolt; "Use your head rotation to control VR body rotation!"; Aug. 2014, pp. 1-3.*

Peterept et al.; "Player Rotaton by accelerated head movement"; Feb. 2015; pp. 1-3.*

Notice of Allowance in JP Application No. 2017-005154, dated Sep. 26, 2017, 5pp.

Yasuyuki Sumi, "Multiparty Interaction Structure Understanding based on Multimodal Conversation Data", Multimedia, Distibuted, Cooperative, and Mobile Symposium (2012), vol. 2012 No. 1, Jul. 4, 2012, pp. 2030-2041, Japan, 12pp.

\* cited by examiner

FIG. 15

| TIME | u[degree/sec] | v[degree/sec] | w[degree/sec] |
|---|---|---|---|
| 12012320 | 0.5 | 910 | 0.5 |
| 12012330 | 0.7 | 914 | 0.2 |
| 12012340 | 0.8 | 912 | 0.3 |
| : | : | : | : |

1436

METHOD FOR COMMUNICATING VIA VIRTUAL SPACE AND SYSTEM FOR EXECUTING THE METHOD

RELATED APPLICATIONS

The present application claims priority to Japanese application No. 2017-005154, filed Jan. 16, 2017, the disclosure of which is hereby incorporated by reference herein in its entirety.

TECHNICAL FIELD

This disclosure relates to a technology of controlling an avatar arranged in a virtual space, and more particularly, to a technology of controlling a motion by the avatar.

BACKGROUND

There is known a technology of providing virtual reality with use of a head-mounted device (HMD). There is proposed a technology of arranging respective avatars of a plurality of users in a virtual space for communication among the plurality of users via those avatars.

In order to promote communication via an avatar in such a virtual space, there has been proposed a technology for translating a motion by a user in a real space in the avatar. For example, regarding a technology of acquiring a motion by a user in a real space, in Japanese Patent Application Laid-open No. 2015-015021 (Patent Document 1), there is described a method involving "generating a three-dimensional representation of a subject by: comparing a depth image of the subject with a plurality of representative images, each representative image being associated with an individual parametric model of the subject; identifying one of the plurality of representative images as a representative image most similar to the depth image of the subject; selecting the parametric model associated with the representative image most similar to the depth image; and fitting the selected parametric model to the depth image of the subject" (see "Abstract").

PATENT DOCUMENTS

[Patent Document 1] JP 2015-015021 A

SUMMARY

According to at least one embodiment of this disclosure, there is provided a method. The method includes defining a virtual space associated with a user, the virtual space including an avatar associated with the user, the avatar including a head and a body. The method further includes acquiring, in response to rotation of a head of the user, information representing an angular velocity of the rotation. The method further includes detecting that the angular velocity is equal to or more than a threshold value. The method further includes rotating, in response to detecting that the angular velocity is equal to or more than the threshold value, the head of the avatar without rotating the body of the avatar.

The above-mentioned and other objects, features, aspects, and advantages of the disclosure may be made clear from the following detailed description of this disclosure, which is to be understood in association with the attached drawings.

BRIEF DESCRIPTION OF THE DRAWINGS

FIG. 15 A table of a data structure example of motion detection data according to at least one embodiment of this disclosure.

DETAILED DESCRIPTION

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
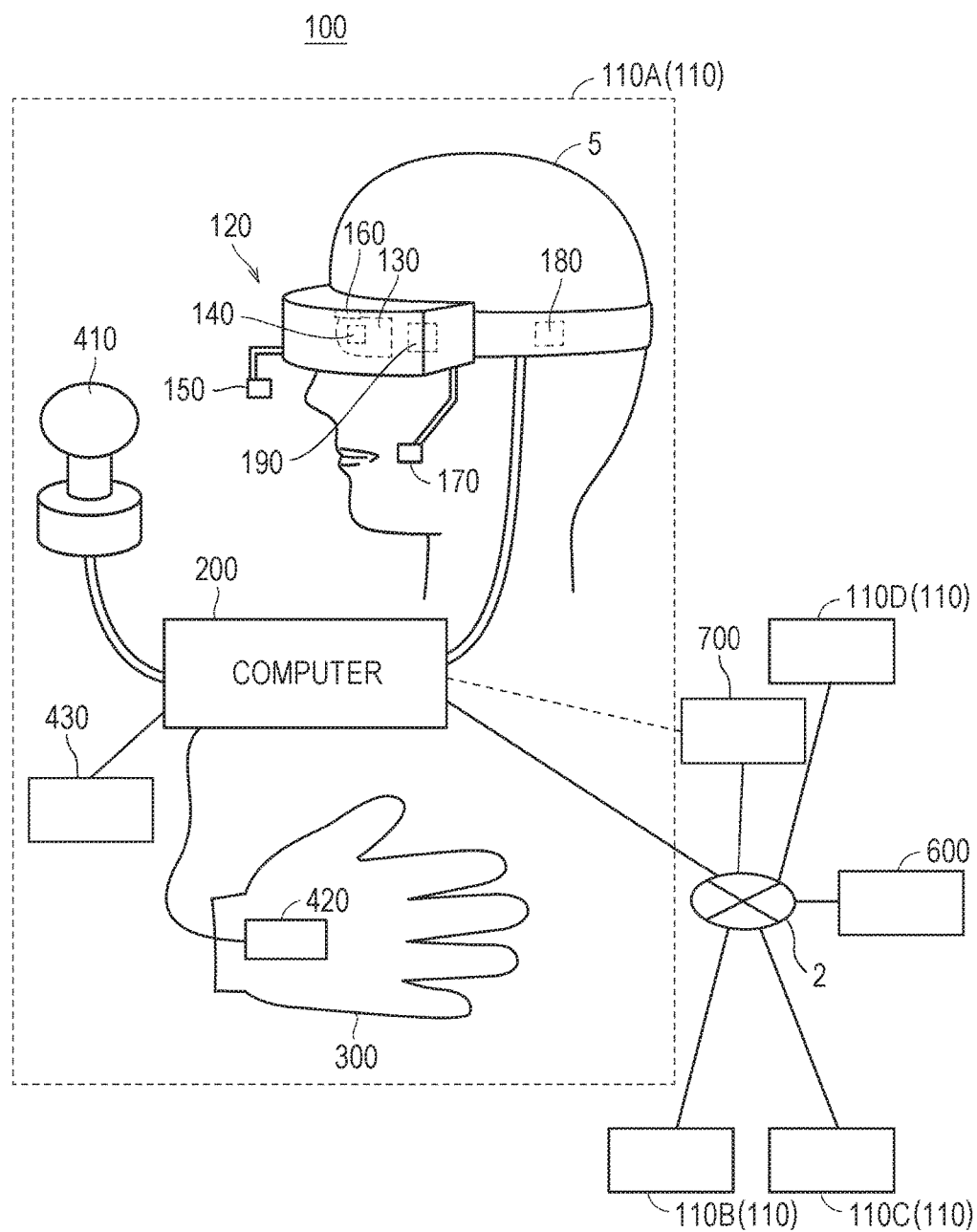
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
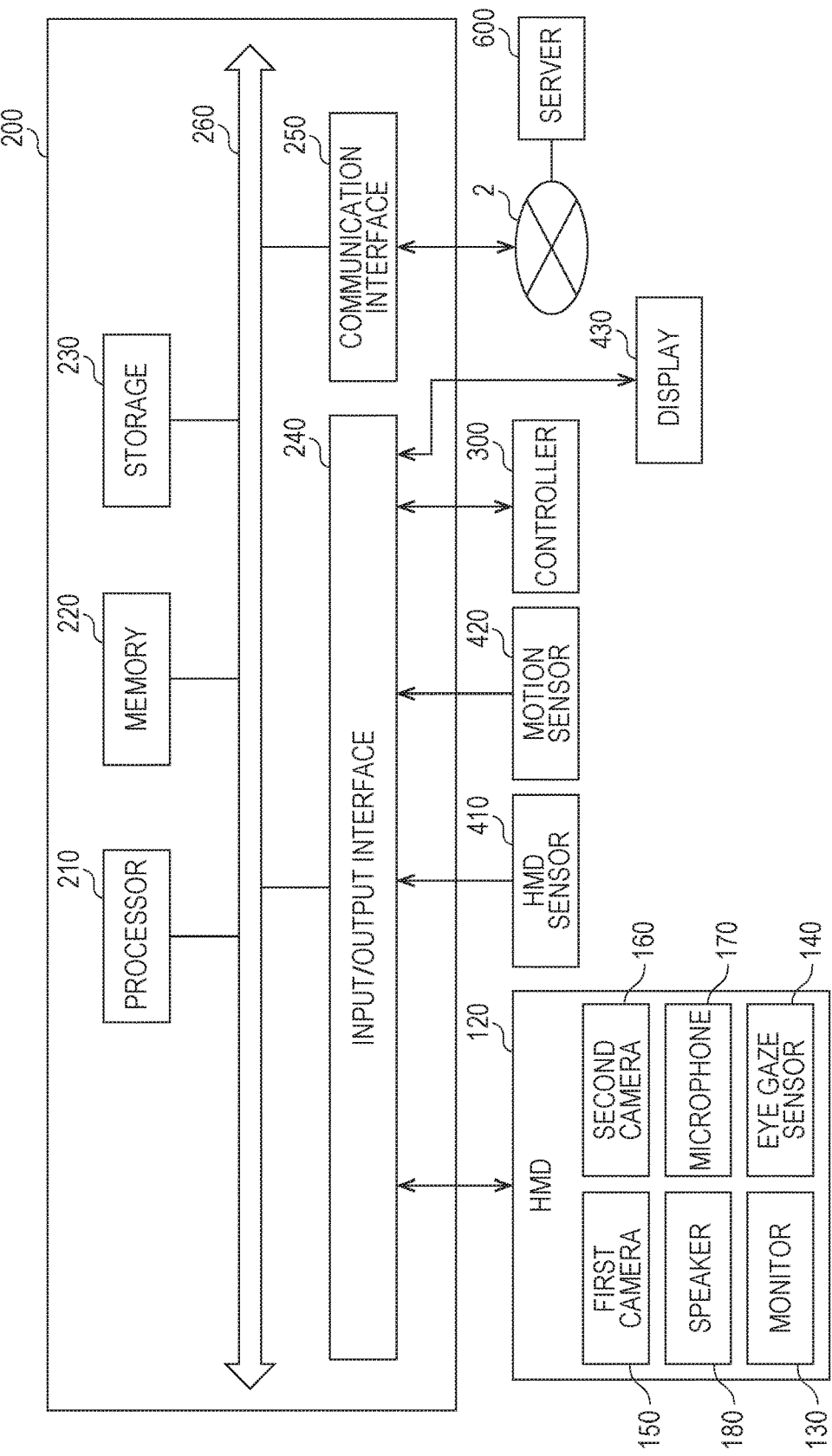
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-field Coordinate System]

Figure 3:
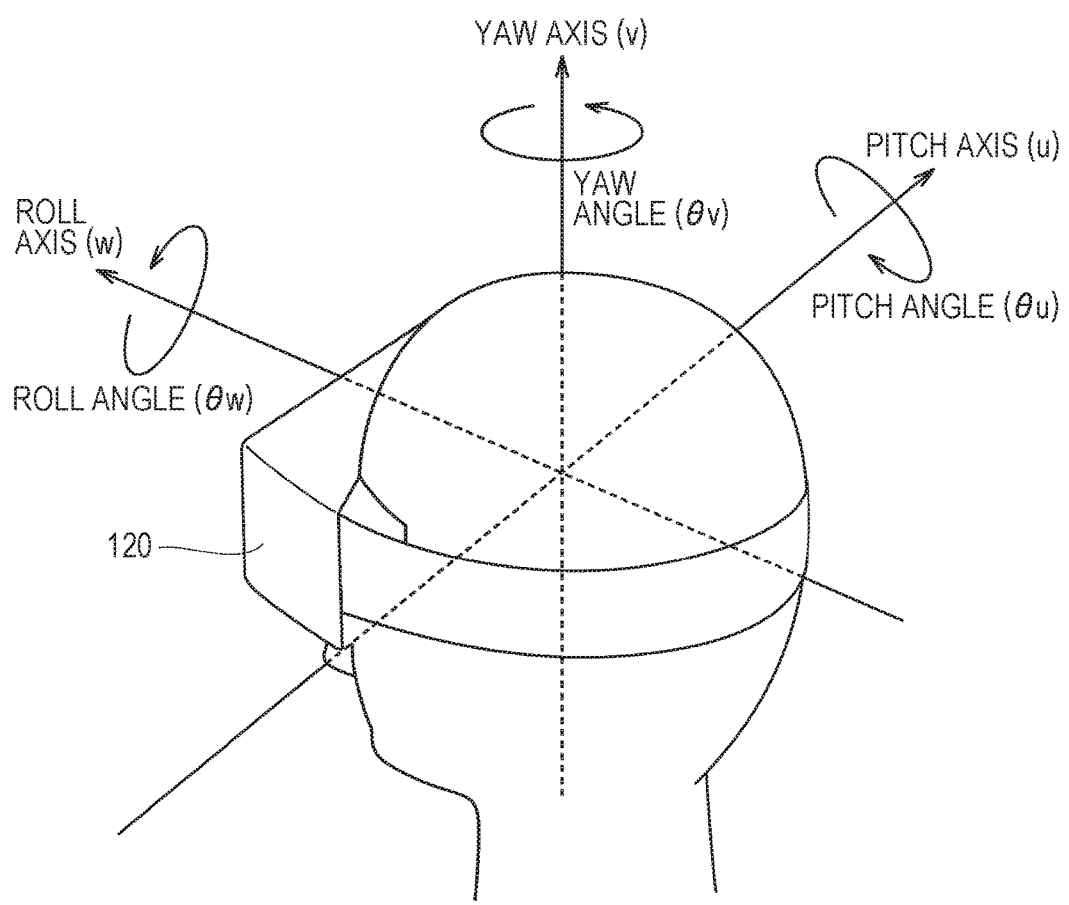
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle (θu), a yaw angle (θv), and a roll angle (θw) of the HMD 120 in the uvw visual-field coordinate system. The pitch angle (θu) represents an inclination angle of the HMD 120 about the pitch axis in the uvw visual-field coordinate system. The yaw angle (θv) represents an inclination angle of the HMD 120 about the yaw axis in the uvw visual-field coordinate system. The roll angle (θw) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
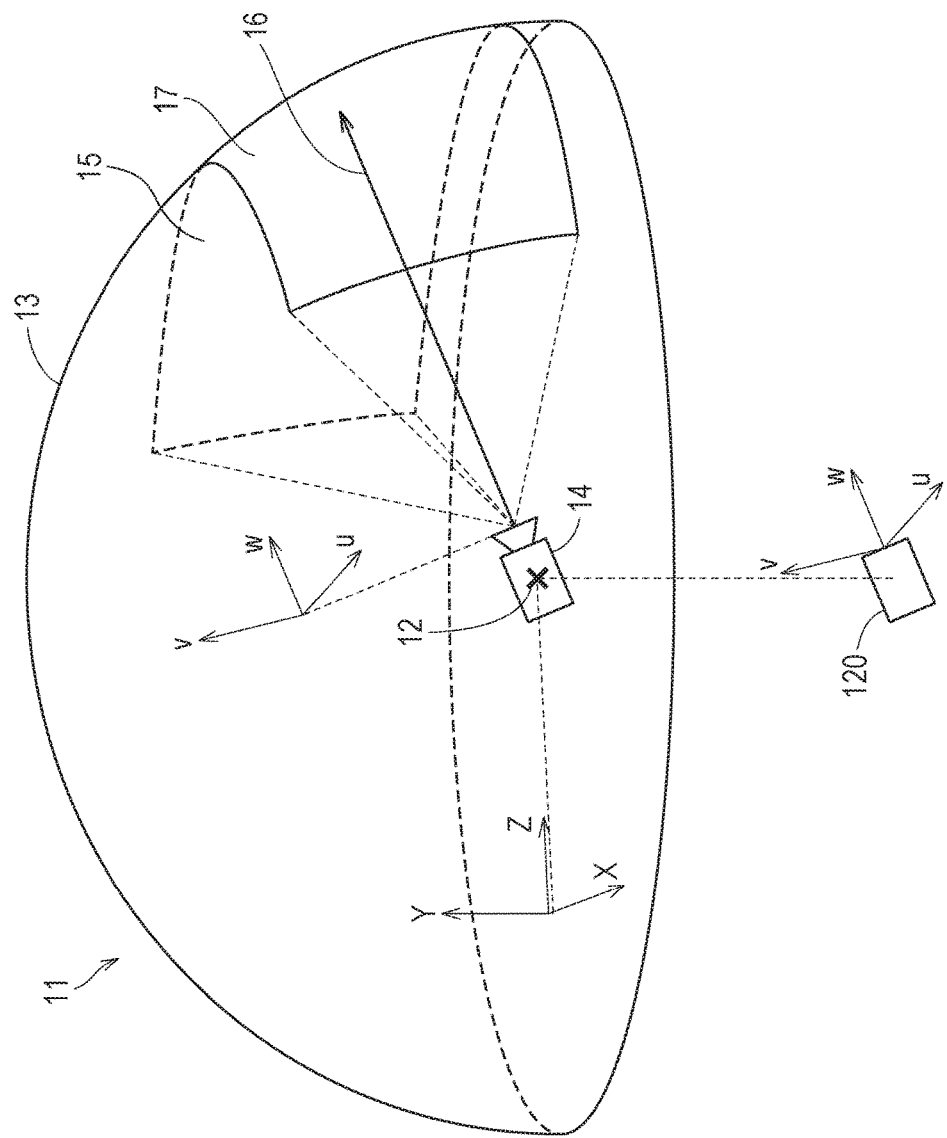
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
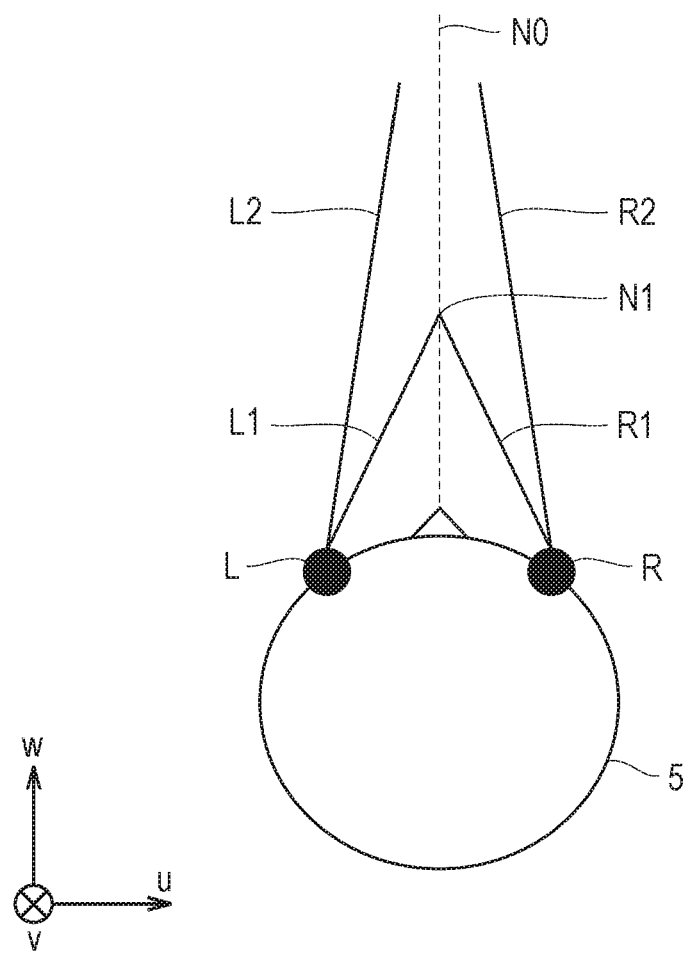
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
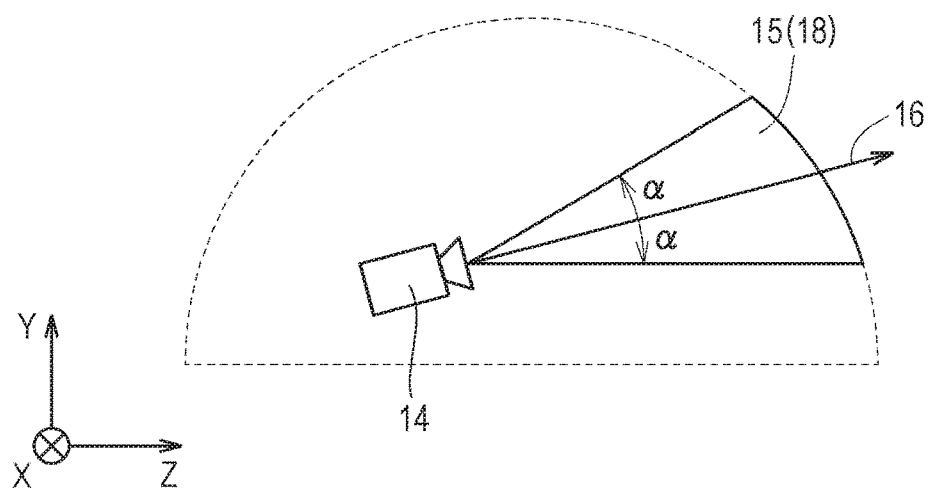
FIG. 6 A diagram of a YZ cross section obtained by viewing a field-of-view region from an X direction in the virtual space according to at least one embodiment of this disclosure.
Figure 7:
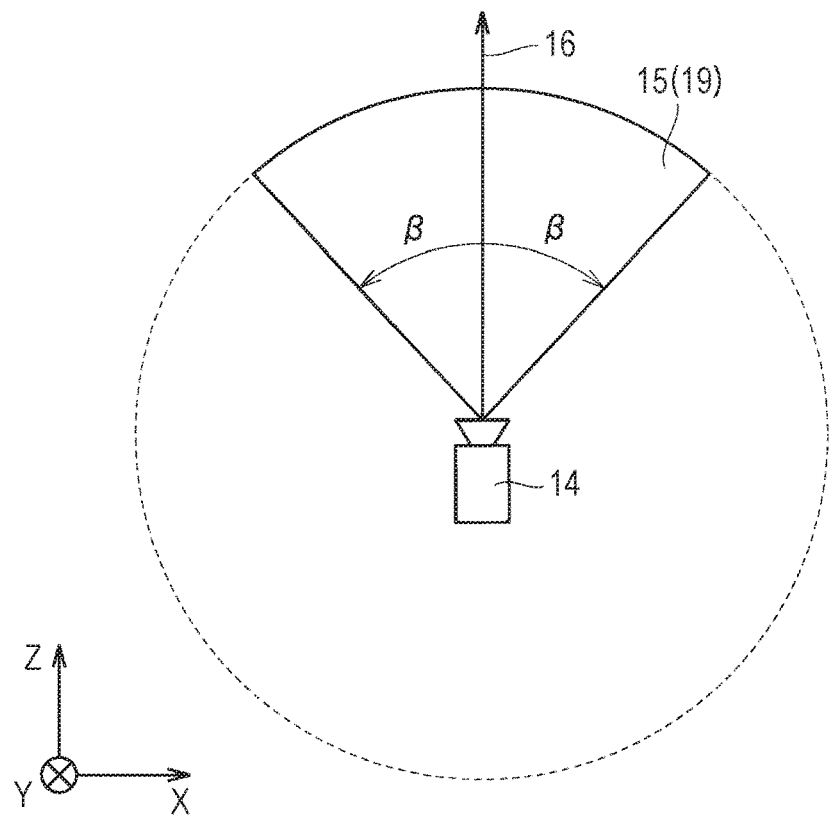
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle $\alpha$ from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth $\beta$ from the reference line of sight 16 serving as the center in the virtual space 11 as the region 19. The polar angle $\alpha$ and $\beta$ are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
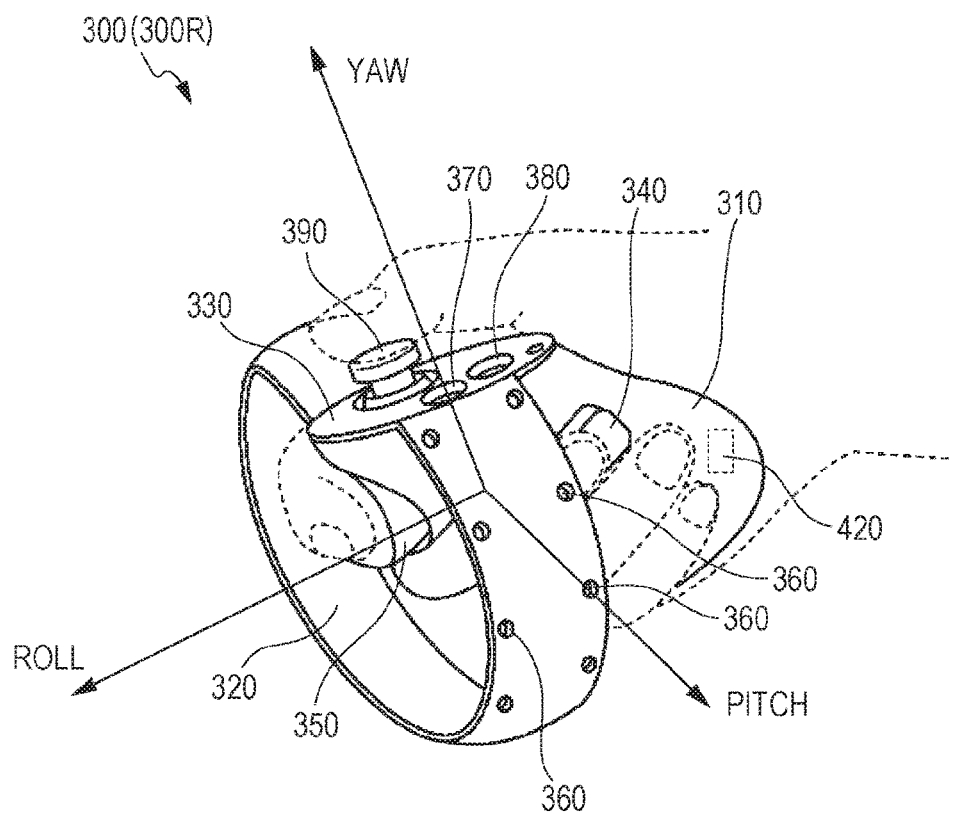
FIG. 8A A diagram of a schematic configuration of a controller according to at least one embodiment of this disclosure.
Figure 8B:
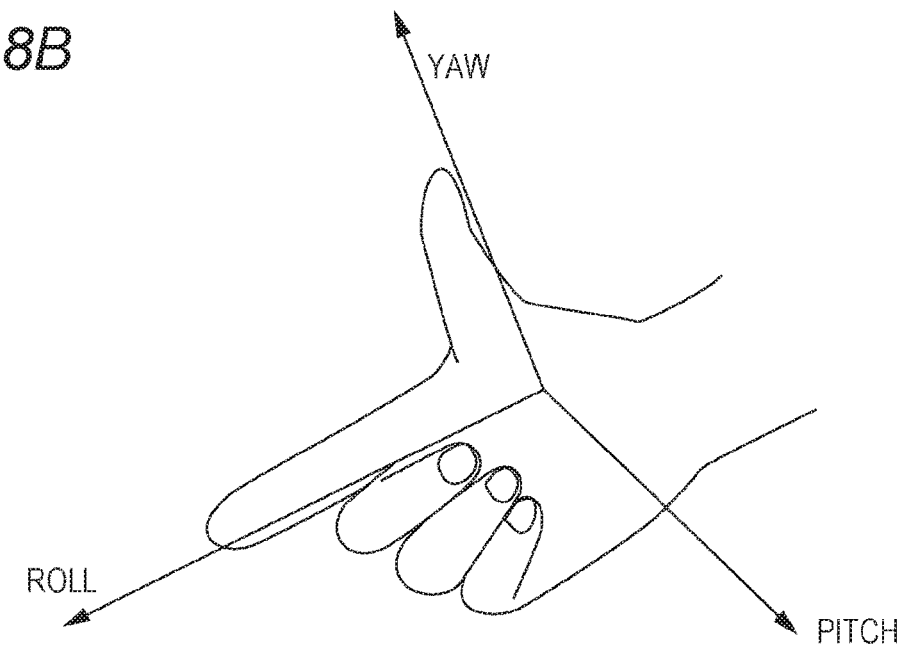
FIG. 8B A diagram of an example of a yaw direction, a roll direction, and a pitch direction that are defined with respect to a right hand of the user according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane defined by the yaw-direction axis and the roll-direction axis when the user 5 extends his or her thumb and index finger is defined as the pitch direction.

[Hardware Configuration of Server]

Figure 9:
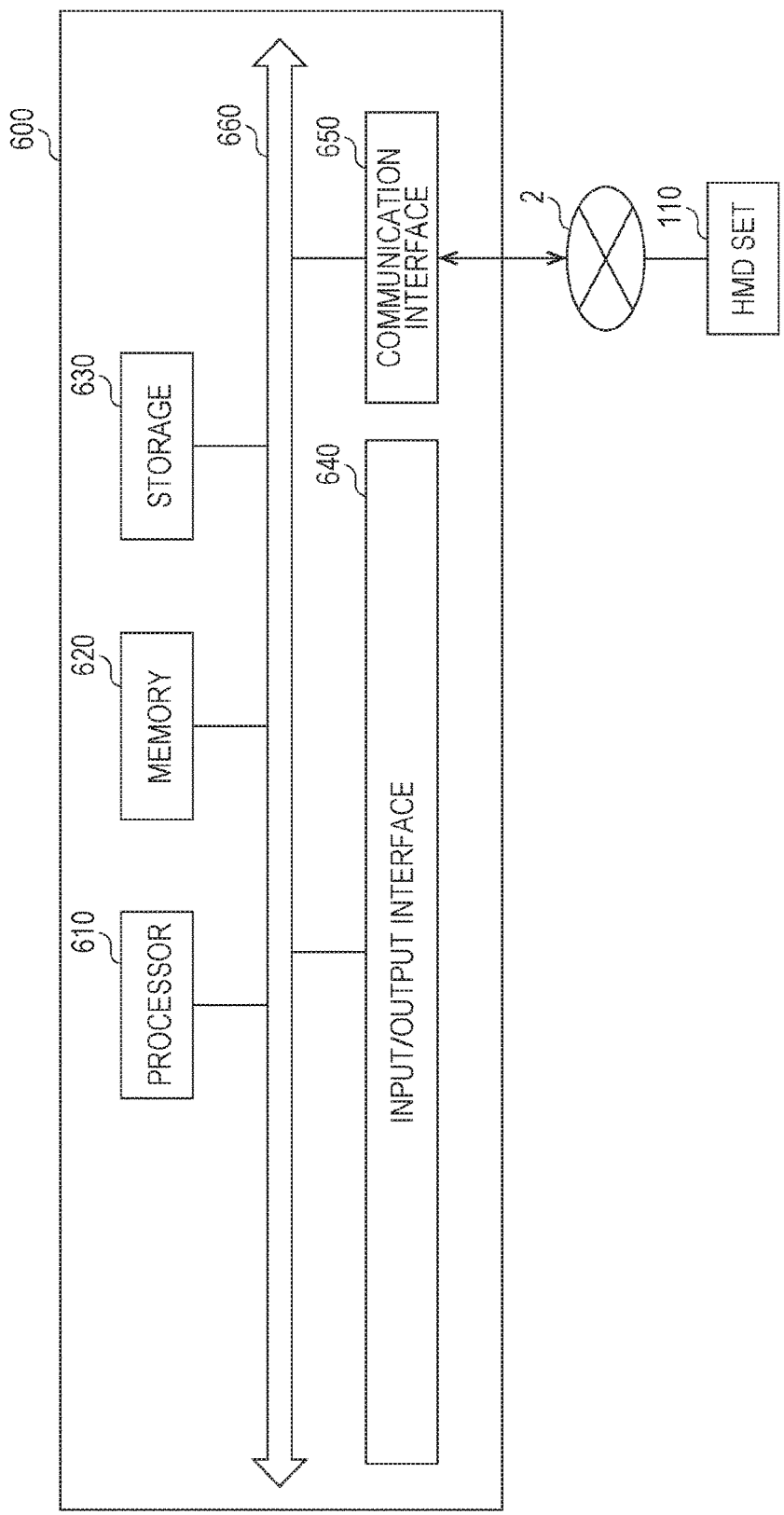
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
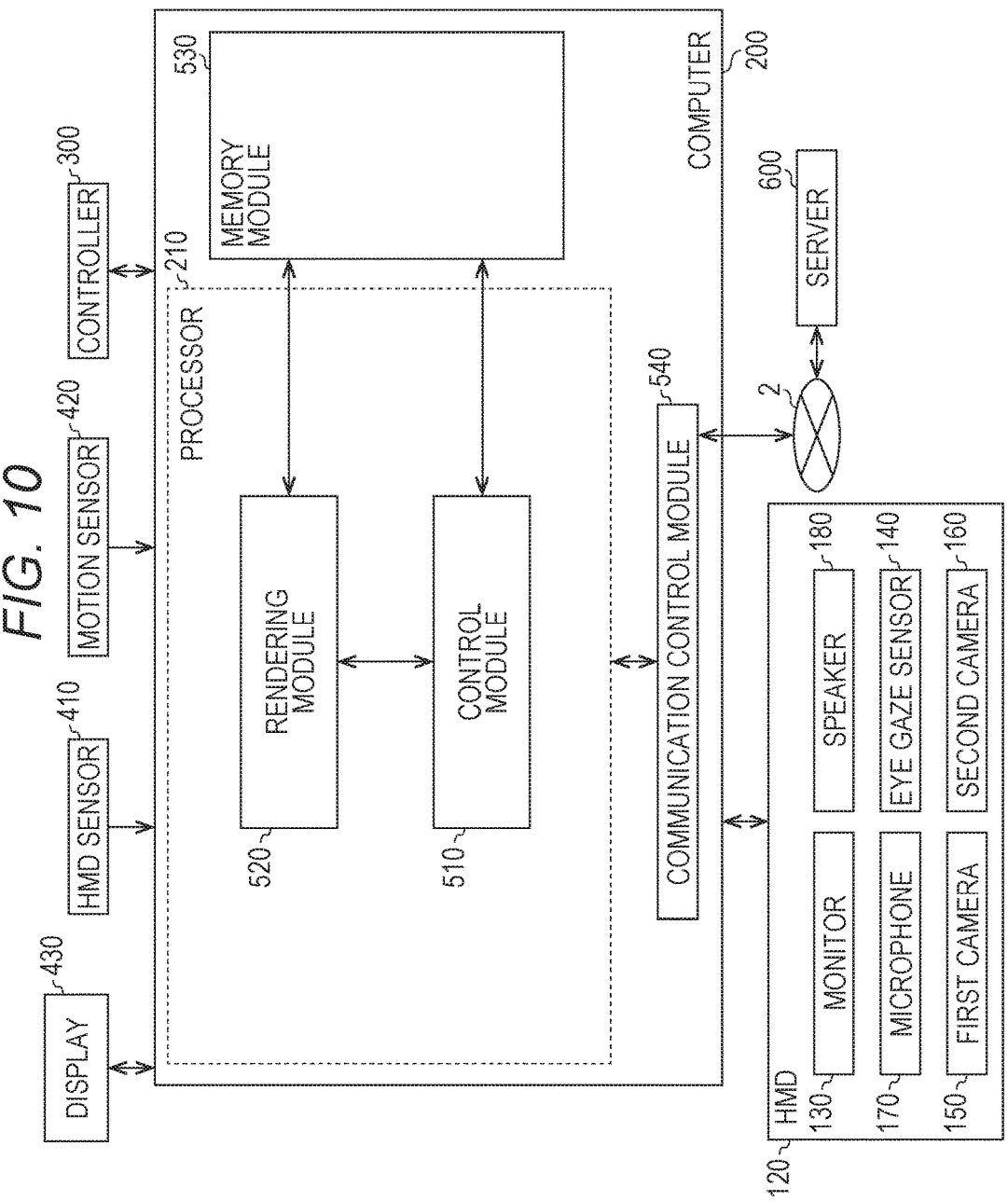
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity® provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

Figure 11:
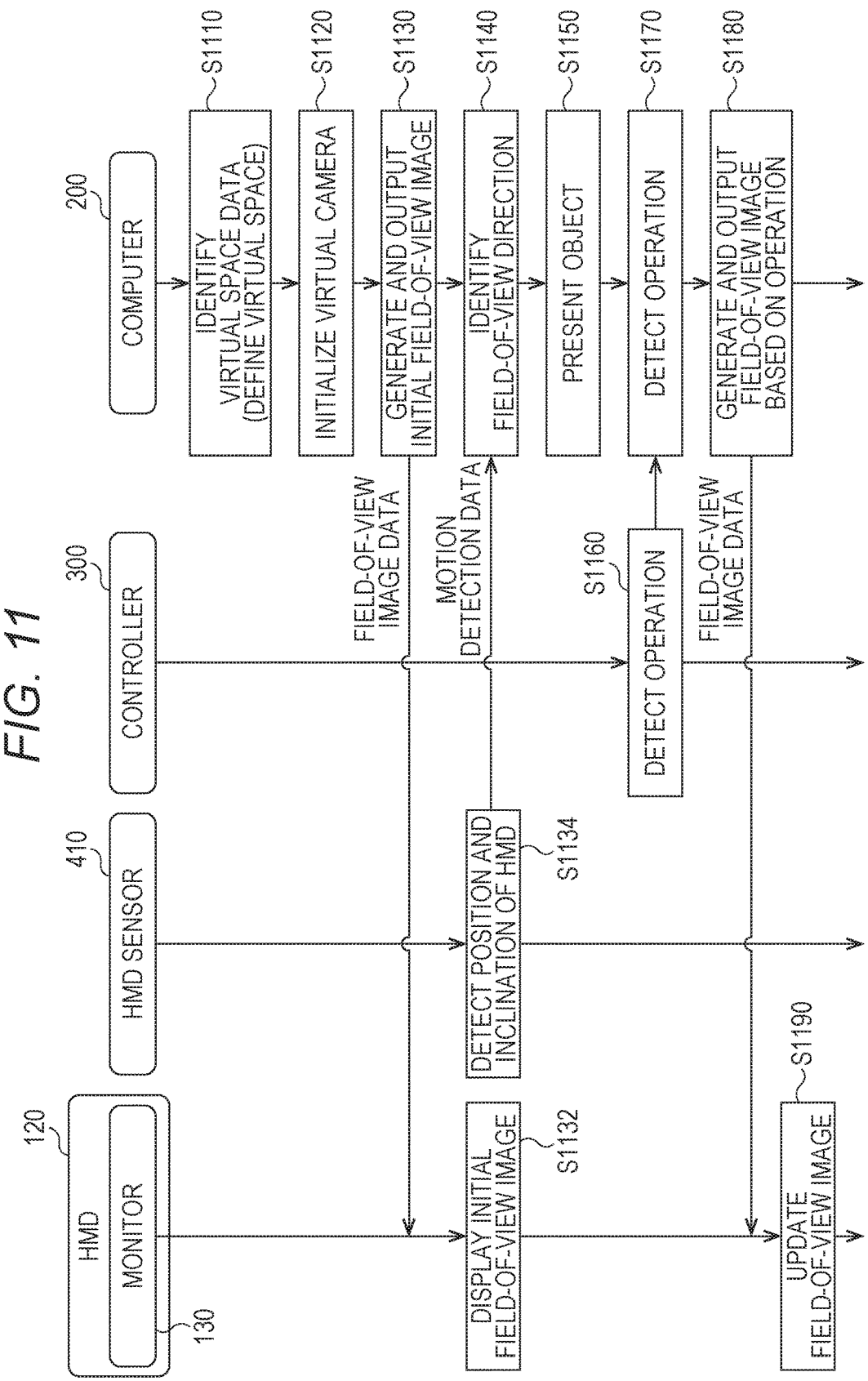
FIG. 11 A sequence chart of processing to be executed by a system including an HMD set according to at least one embodiment of this disclosure.

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
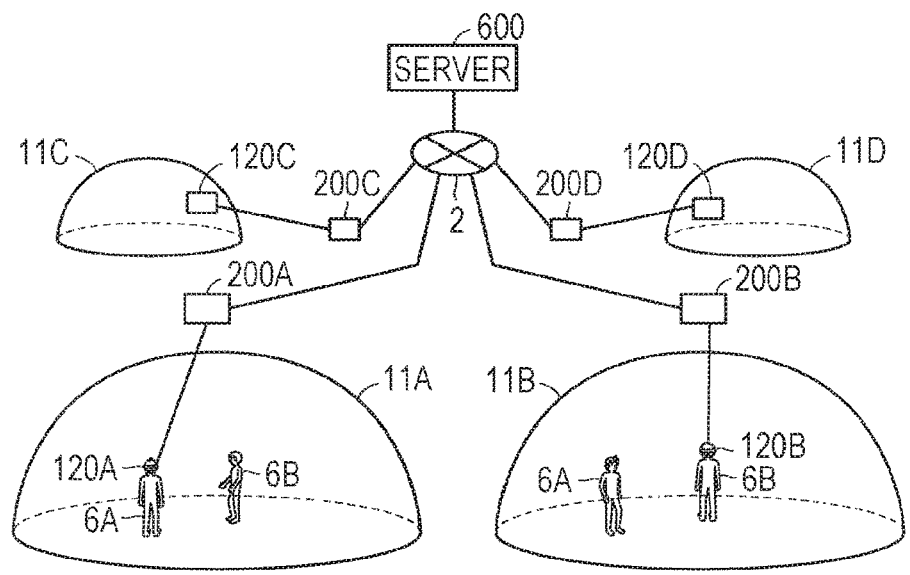
FIG. 12A A schematic diagram of HMD systems of several users sharing the virtual space interact using a network according to at least one embodiment of this disclosure.
Figure 12B:
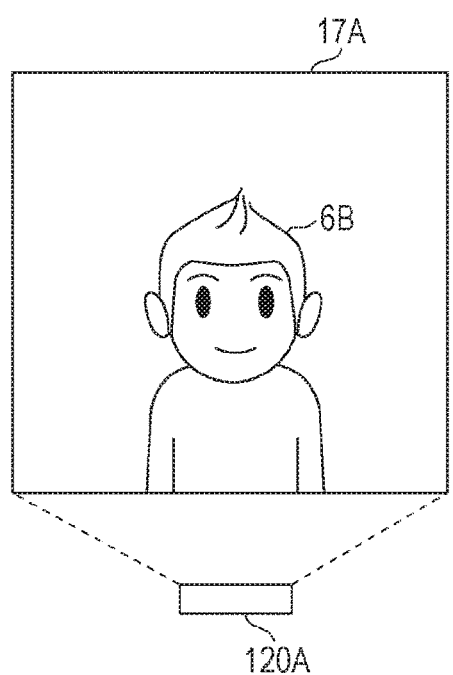
FIG. 12B A diagram of a field-of-view image of a user 5A in FIG. 12A according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12 (B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
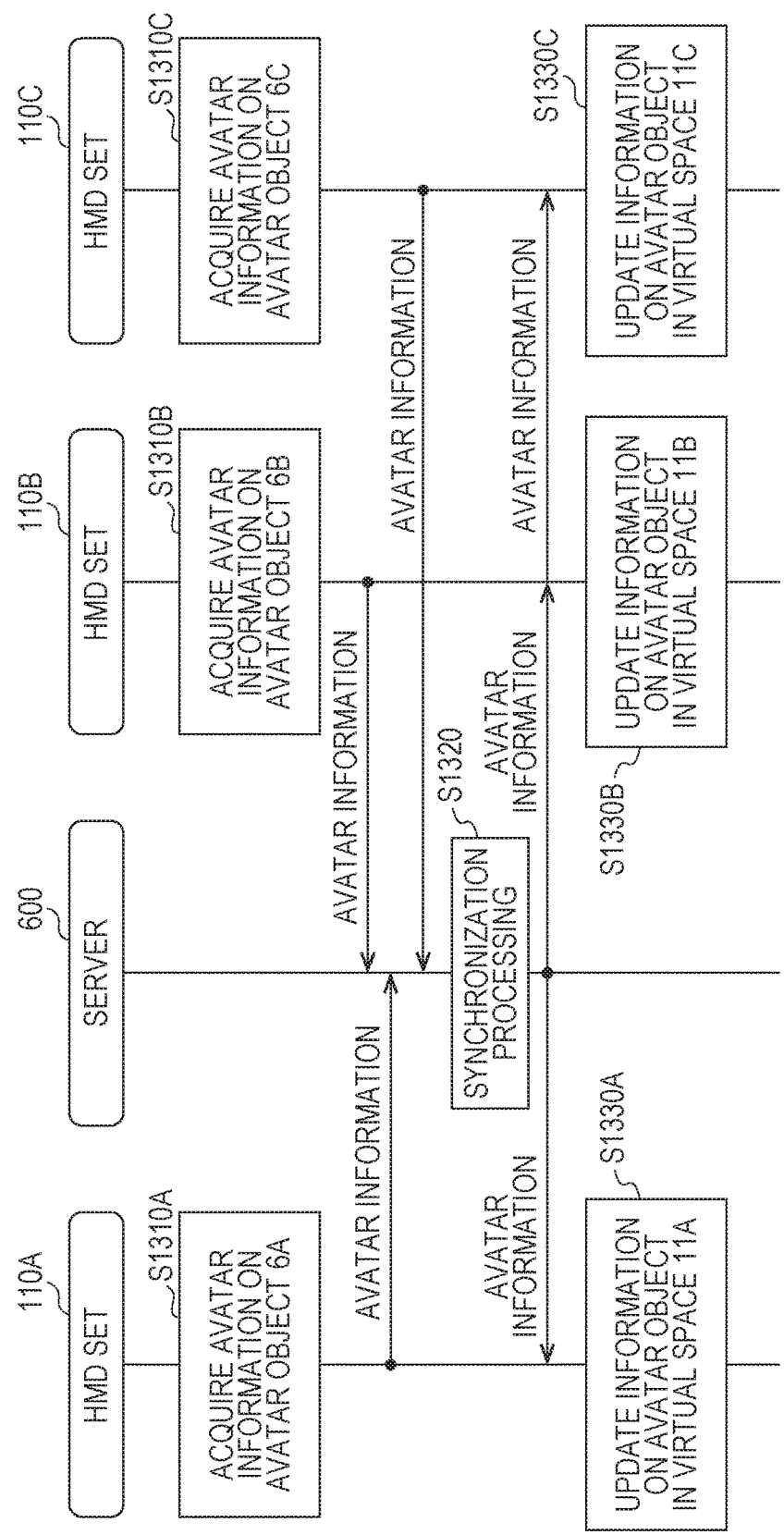
FIG. 13 A sequence diagram of processing to be executed by a system including an HMD interacting in a network according to at least one embodiment of this disclosure.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Details of Module Configuration]

Figure 14:
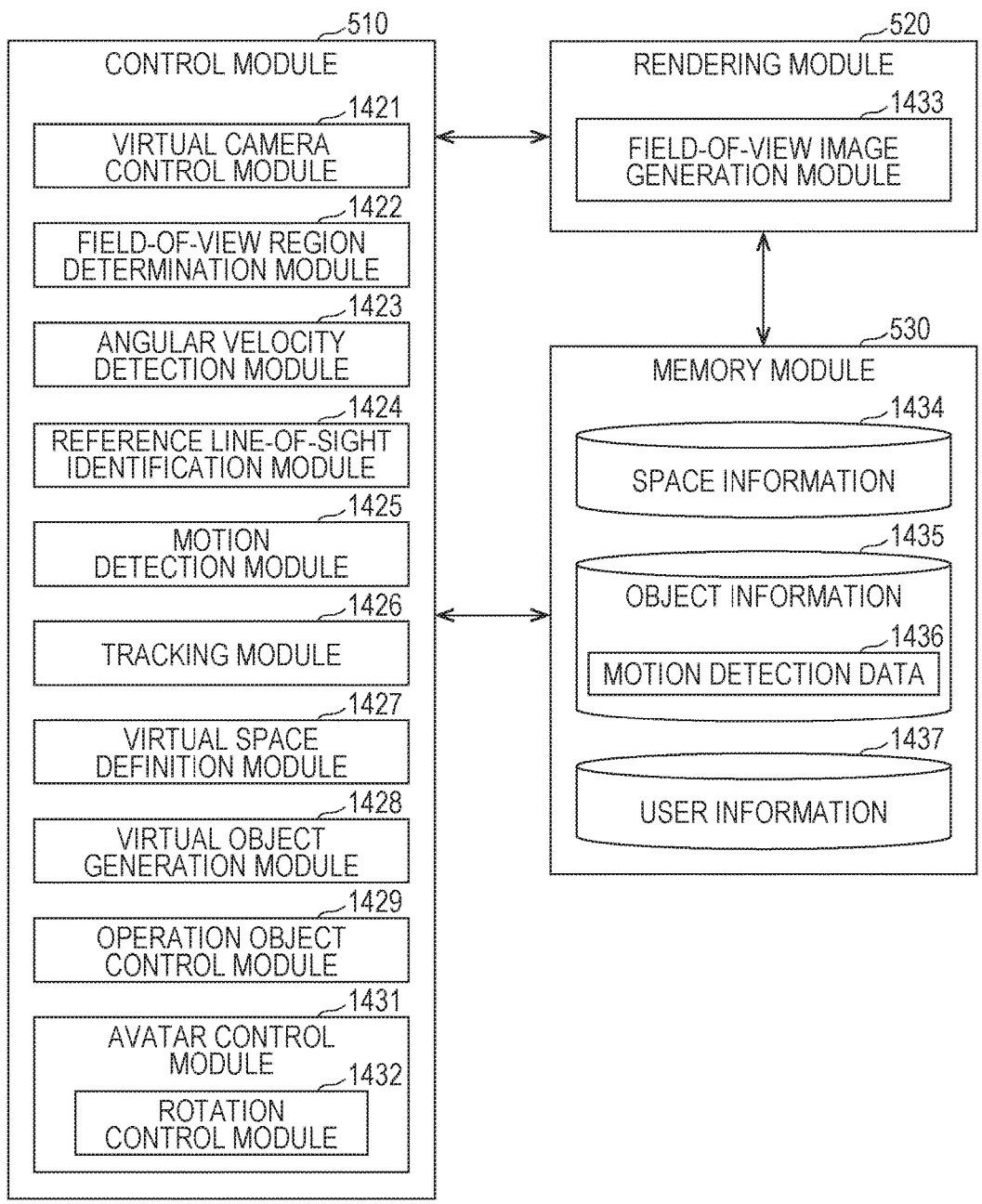
FIG. 14 A block diagram of a detailed configuration of modules of the computer according to at least one embodiment of this disclosure.

With reference to FIG. 14, details of a module configuration of the computer 200 are described. FIG. 14 is a block diagram of a configuration of modules of the computer according to at least one embodiment of this disclosure.

In FIG. 14, the control module 510 includes a virtual camera control module 1421, a field-of-view region determination module 1422, an angular velocity detection module 1423, a reference line-of-sight identification module 1424, a motion detection module 1425, a tracking module 1426, a virtual space definition module 1427, a virtual object generation module 1428, an operation object control module 1429, and an avatar control module 1431. The avatar control module 1431 includes a rotation control module 1432. The rendering module 520 includes a field-of-view image generation module 1433. The memory module 530 stores space information 1434, object information 1435, and user information 1437. The object information 1435 includes the motion detection data 1436.

The control module 510 controls image display on the monitor 130 of the HMD 120. The virtual camera control module 1421 arranges the virtual camera 14 in the virtual space 11. The virtual camera control module 1421 controls a position in the virtual space 11 at which the virtual camera 14 is arranged and the inclination (direction) of the virtual camera 14. The field-of-view region determination module 1422 determines the visually-recognized region 15 based on the inclination of the HMD 120 (i.e., output of sensor 190) and the position at which the virtual camera 14 is arranged. The field-of-view image generation module 1433 generates the field-of-view image 17 to be displayed on the monitor 130 based on the determined visually-recognized region 15. In the following, the sensor 190 may also be referred to as a gyro sensor 190.

The angular velocity detection module 1423 converts the output (e.g., voltage value) of each axis of the gyro sensor 190 into an angular velocity. The angular velocity detection module 1423 is capable of discriminating whether each axis is rotating clockwise or counterclockwise. The angular velocity detection module 1423 outputs the converted axial angular velocities to the virtual camera control module 1421, the field-of-view region determination module 1422, and the reference line-of-sight identification module 1424. Those modules may identify the inclination of the HMD 120 based on the angular velocities input from the angular velocity detection module 1423. When the gyro sensor 190 is capable of outputting digital data representing the angular velocities instead of analog data, the angular velocity detection module 1423 may be omitted from the computer 200.

The reference line-of-sight identification module 1424 identifies the line-of-sight of the user 5 (i.e., inclination of the HMD 120) based on the output from the gyro sensor 190 or the HMD sensor 410. In at least one aspect, the reference line-of-sight identification module 1424 identifies the line-of-sight of the user 5 based on the signal from the eye gaze sensor 140. The motion detection module 1425 may detect, based on the output from the HMD sensor 410, a displacement amount of the HMD 120 relative to a reference state (e.g., origin in a global coordinate system). In at least one aspect, the displacement amount is the distance between the HMD sensor 410 and the HMD 120.

The tracking module 1426 detects (tracks) the position of the hands of the user 5. In this embodiment, the tracking module 1426 detects, based on depth information input from the first camera 150, the position of the hands of the user 5 in a uvw visual field coordinate system set in the HMD 120. More specifically, the tracking module 1426 detects the relative position of the hands of the user 5 in the uvw visual field coordinate system based on the first camera 150 as a reference. The first camera 150 and the tracking module 1426 may be implemented by, for example, by Leap Motion® provided by Leap Motion, Inc.

The first camera 116 is capable of acquiring depth information on a target object. As an example, the first camera 116 acquires depth information on a target object in accordance with a time-of-flight (TOF) method. As at least one example, the first camera 116 acquires depth information on a target object in accordance with a pattern irradiation method. In at least one embodiment of this disclosure, the first camera 116 is a stereo camera capable of photographing a target object from two or more different directions. The first camera 116 may also be a camera capable of photographing infrared rays that are invisible to people. The first camera 116 is mounted on the HMD 120 and photographs a hand of the user. The first camera 116 outputs the acquired hand depth information to the computer 200.

The control module 510 controls the virtual space 11 provided to the user 5. The virtual space definition module 1427 generates virtual space data representing the virtual space 11, to thereby define the virtual space 11 in the system 100.

The virtual object generation module 1428 generates objects to be arranged in the virtual space 11. The objects may include, for example, forests, mountains, other landscapes, and animals to be arranged in accordance with the progression of the story of the game.

The operation object control module 1429 arranges, in the virtual space 11, an operation object for receiving an operation of the user in the virtual space 11. The user operates the operation object to operate an object arranged in the virtual space 11, for example. In at least one aspect, the operation object includes, for example, a hand object corresponding to the hand of the user wearing the HMD 120. In at least one aspect, the operation object corresponds to a hand of an avatar object described later.

The avatar control module 1431 generates data for arranging an avatar object of the user of another computer 200, which is connected via the network, in the virtual space 11. In at least one aspect, the avatar control module 1431 generates data for arranging an avatar object of the user 5 in the virtual space 11. In at least one aspect, the avatar control module 1431 generates an avatar object simulating the user 5 based on an image including the user 5. In at least one aspect, the avatar control module 1431 generates data for arranging an avatar object in the virtual space 11, which is selected by the user 5 from among a plurality of types of avatar objects (e.g., objects simulating animals or objects of deformed humans).

In at least one aspect, in the head of the avatar object, a uvw visual field coordinate system is defined in the same manner as for the HMD 120. As a result, when the inclination of the HMD 120 in the real space (global coordinate system) changes, the inclination of the head of the avatar object also changes accordingly.

The avatar control module 1431 translates the motion by the HMD 120 in the avatar object based on the angular velocities output by the angular velocity detection module 1423. For example, the avatar control module 1431 generates data for rotating the head of the avatar object about the yaw axis in accordance with the angular velocity about the yaw axis input from the angular velocity detection module 1423. The avatar control module 1431 translates, based on the output from the tracking module 1426, the motion by the hands of the user in the real space in the hands of the avatar object. The avatar control module 1431 controls the motion by the avatar object corresponding to the user of another computer based on angular velocity information or the like input from the another computer.

When rotating the head of the avatar object about the yaw axis, the rotation control module 1432 determines whether or not to rotate the head of the avatar object together with the body of the avatar object. The rotation control module 1432 is described in more detail later.

The space information 1434 stores one or more templates that are defined to provide the virtual space 11.

The object information 1435 stores content to be reproduced in the virtual space 11, objects to be used in the content, and information (e.g., positional information) for arranging objects in the virtual space 11. The content may include, for example, game content and content representing landscapes that resemble those of the real world.

The object information 1435 further includes motion detection data 1436. The motion detection data 1436 is data representing the angular velocity about each axis of the HMD 120 detected by the angular velocity detection module 1423, namely, the inclination of the HMD 120.

FIG. 15 is a table of a data structure example of the motion detection data 1436 according to at least one embodiment of this disclosure. The motion detection data 1436 stores the time and the angular velocity about each axis (pitch axis (u axis), yaw axis (v axis), and roll axis (w axis)) set in the HMD 120 in association with each other. This time is the timing at which the gyro sensor 190 detected the data (e.g., voltage value) corresponding to the angular velocities. In the example shown in FIG. 15, the angular velocity about the yaw axis (v axis) is large. This indicates that the user 5 has rotated his/her head about the yaw axis (v axis) in the real space.

In at least one aspect, the motion detection data 1436 includes, in addition to outputs from the gyro sensor 190, outputs from an acceleration sensor or outputs from a geomagnetic sensor. In at least one aspect, the motion detection data 1436 is data representing outputs from the HMD sensor 410, namely, the position and inclination of the HMD 120.

Referring again to FIG. 14, the user information 1437 stores a program for causing the computer 200 to function as the control apparatus of the system 100, application programs using the various content stored in the object information 1435, and the like.

[Control Structure of Computer 200]

Figure 16:
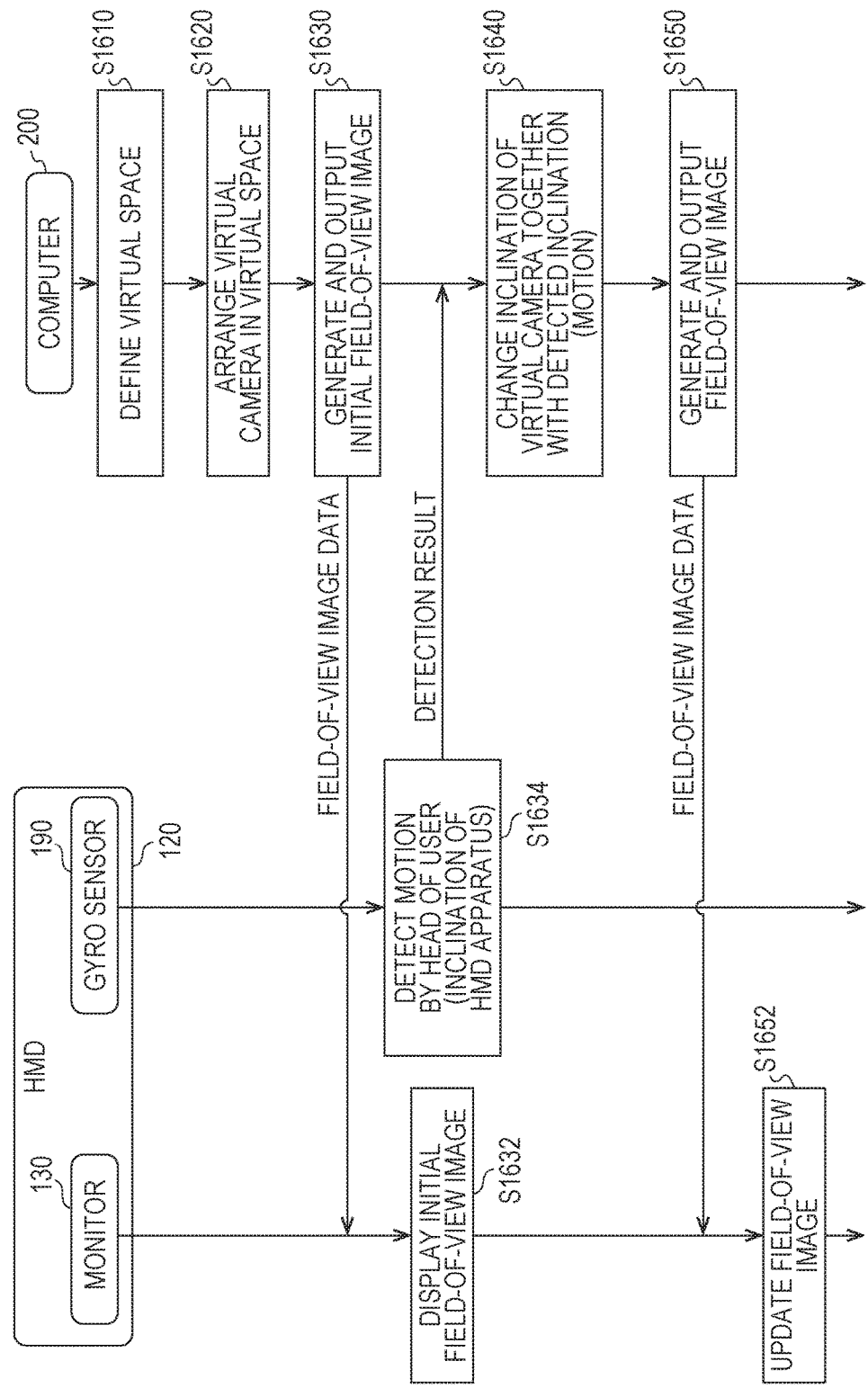
FIG. 16 A flowchart of processing in the system according to at least one embodiment of this disclosure.

A method of updating the field-of-view image in the computer 200 is now described with reference to FIG. 16. FIG. 16 is a flowchart of processing in the system 100 according to at least one embodiment of this disclosure.

In Step S1610, the processor 210 of the computer 200 serves as the virtual space definition module 1427 to define the virtual space 11.

In Step S1620, the processor 210 arranges the virtual camera 14 in the virtual space 11. At this time, in a work area of the memory, the processor 210 may arrange the virtual camera 14 at the center 13 defined in advance in the virtual space 11.

In Step S1630, the processor 210 serves as the field-of-view image generation module 1433 to generate field-of-view image data for displaying the initial field-of-view image 17. The generated field-of-view image data is transmitted to the HMD 120 by the communication control module 540 via the field-of-view image generation module 1433.

In Step S1632, the monitor 130 of the HMD 120 displays the field-of-view image 17 based on a signal received from the computer 200. The user 5 wearing the HMD 120 may recognize the virtual space 11 through visual recognition of the field-of-view image 17.

In Step S1634, the gyro sensor 190 detects the motion by the head of the user 5 (angular velocity about each axis of HMD 120). The gyro sensor 190 outputs the detection result to the computer 200.

In Step S1640, the processor 210 serves as the angular velocity detection module 1423 to calculate the angular velocity about each axis of the HMD 120 based on the detection result input from the gyro sensor 190. Then, based on the calculated angular velocities, the processor 210 detects the inclination of the HMD 120. The processor 210 also serves as the virtual camera control module 1421 to change the inclination of the virtual camera 14 (i.e., reference line-of-sight 5 of virtual camera 14) so as to move together with the detected inclination. As a result, the field-of-view image 17 photographed by the virtual camera 14 is updated.

In Step S1650, the processor 210 serves as the field-of-view image generation module 1433 to generate field-of-view image data for displaying the field-of-view image 17 photographed by the virtual camera 14 having a changed inclination, and output the generated field-of-view image data to the HMD 120.

In Step S1652, the monitor 130 of the HMD 120 displays the updated field-of-view image based on the received field-of-view image data. As a result, the field-of-view of the user in the virtual space 11 is updated.

[Avatar Object]

Figure 17:
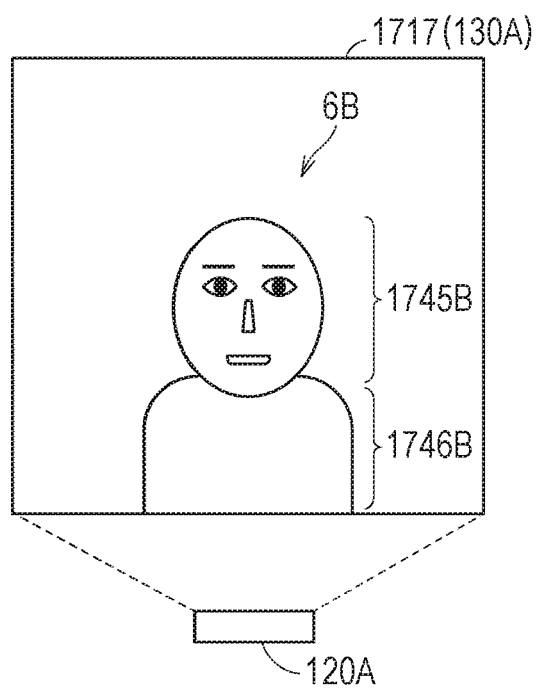
FIG. 17 A diagram of an avatar object of each user of the HMD set according to at least one embodiment of this disclosure.

FIG. 17 is a diagram of the field-of-view region 1717 of the user 5A according to at least one embodiment of this disclosure. The field-of-view region 1717 is an image displayed on a monitor 130A of the HMD 120A. This field-of-view region 1717 is an image generated by the virtual camera 14A. The avatar object 6B corresponding to the user 5B is displayed in the field-of-view region 1717. In FIG. 17, the avatar object 6B includes a head 1745B and a body 1746B. Although not in FIG. 17, the avatar object 6A of the user 5A is similarly displayed in the field-of-view image of the user 5B.

Under the state of FIG. 17, the user 5A is able to communicate to/from the user 5B via the virtual space through conversation. More specifically, voice data of the user 5A acquired by a microphone 170A is transmitted to the HMD 120B of the user 5B via the server 600 and output from a speaker 180B provided on the HMD 120B. Voice data of the user 5B is transmitted to the HMD 120A of the user 5A via the server 600, and output from a speaker 180A provided on the HMD 120A.

As described later with reference to FIG. 19, a motion by the user 5B (motion by HMD 120B and motion by hand of user 5B) is translated in the avatar object 6B arranged in the virtual space 11A by the avatar control module 1431A. With this, the user 5A is able to recognize the motion by the user 5B through the avatar object 6B.

[Control Structure of Server 600]

Figure 18:
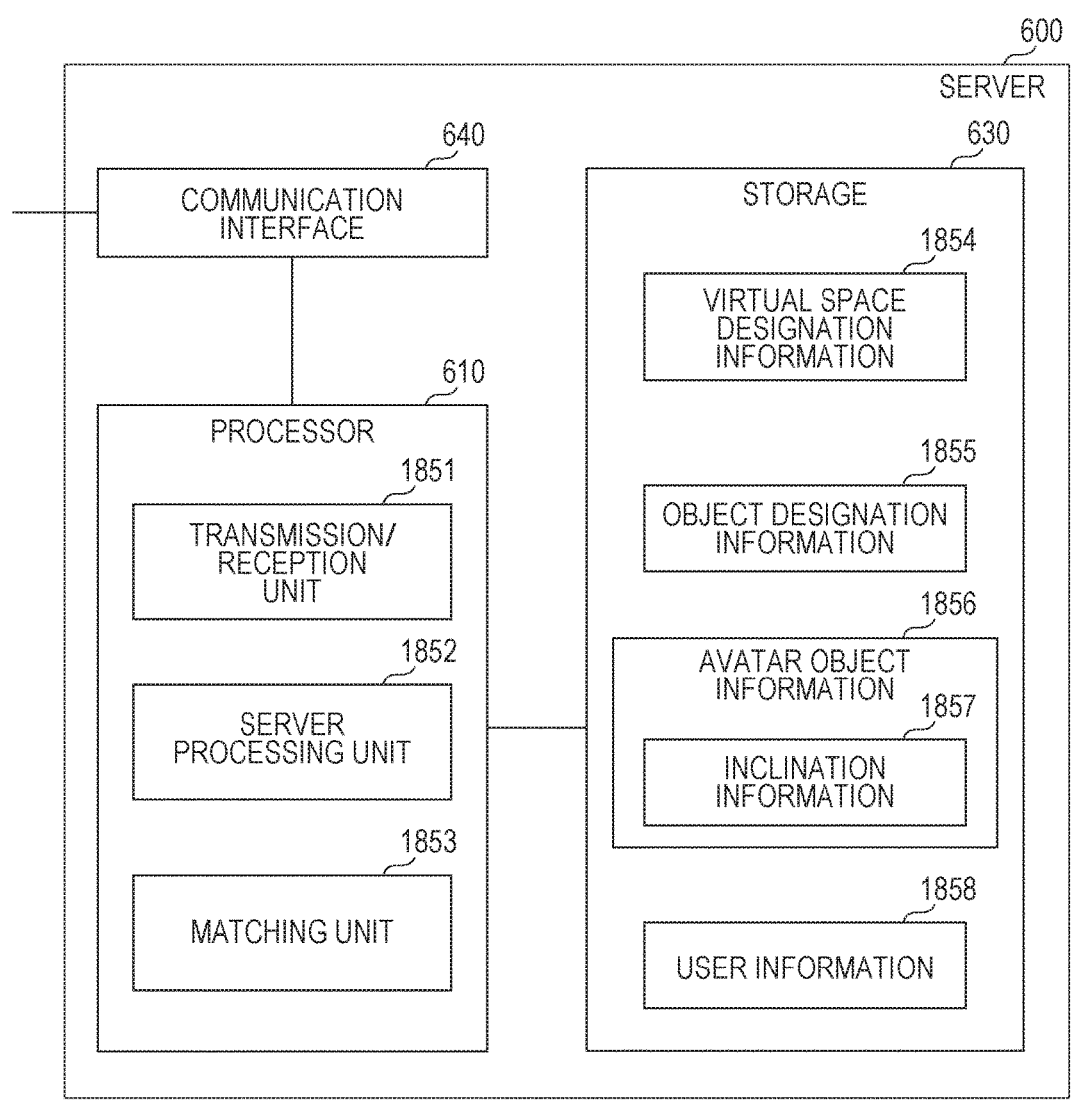
FIG. 18 A diagram of a hardware configuration and a module configuration of the server according to at least one embodiment of this disclosure.

FIG. 18 is a diagram of a hardware configuration and a module configuration of the server 600 according to at least one embodiment of this disclosure. In at least one embodiment of this disclosure, the server 600 includes, as primary components, the communication interface 650, the processor 610, and the storage 630.

The communication interface 650 functions as a communication module for wireless communication, which is configured to perform, for example, modulation/demodulation processing for transmitting/receiving signals to/from an external communication device, for example, the computer 200. The communication interface 650 is implemented by, for example, a tuner or a high frequency circuit.

The processor 610 controls operation of the server 600. The processor 610 executes various control programs stored in the storage 630 to function as a transmission/reception unit 1851, a server processing unit 1852, and a matching unit 1853.

The transmission/reception unit 1851 transmits/receives various kinds of information to/from each computer 200. For example, the transmission/reception unit 1851 transmits to each computer 200 a request for arranging objects in the virtual space 11, a request for deleting objects from the virtual space 11, a request for moving objects, voices of the user, or information for defining the virtual space 11.

The server processing unit 1852 performs processing for a plurality of users to share the same virtual space 11. For example, the server processing unit 1852 updates avatar object information 1856 described later based on the information received from the computer 200.

The matching unit 1853 performs a series of processing steps for associating a plurality of users with one another. For example, when an input operation for the plurality of users to share the same virtual space 11 is performed, the matching unit 1853 performs, for example, processing of associating users belonging to the virtual space 11 to one another.

The storage 630 stores virtual space designation information 1854, object designation information 1855, the avatar object information 1856, and user information 1858.

The virtual space designation information 1854 is information to be used by the virtual space definition module 1427 of the computer 200 to define the virtual space 11. For example, the virtual space designation information 1854 contains information for designating the size of the virtual space 11 and content to be developed in each mesh forming the virtual space 11.

The object designation information 1855 designates an object to be arranged by the virtual object generation module 1428 of the computer 200 in the virtual space 11.

The avatar object information 1856 contains inclination information 1857. The inclination information 1857 represents an inclination of each avatar object in the virtual space 11. The avatar object information 1856 is updated as appropriate based on information (e.g., motion detection data) input from the computer 200.

The user information 1858 is information on the user 5 of the computer 200. The user information 1858 contains, for example, identification information (e.g., user account) identifying the plurality of users 5.

[Control for Translating Operation of User in Avatar Object]

Figure 19:
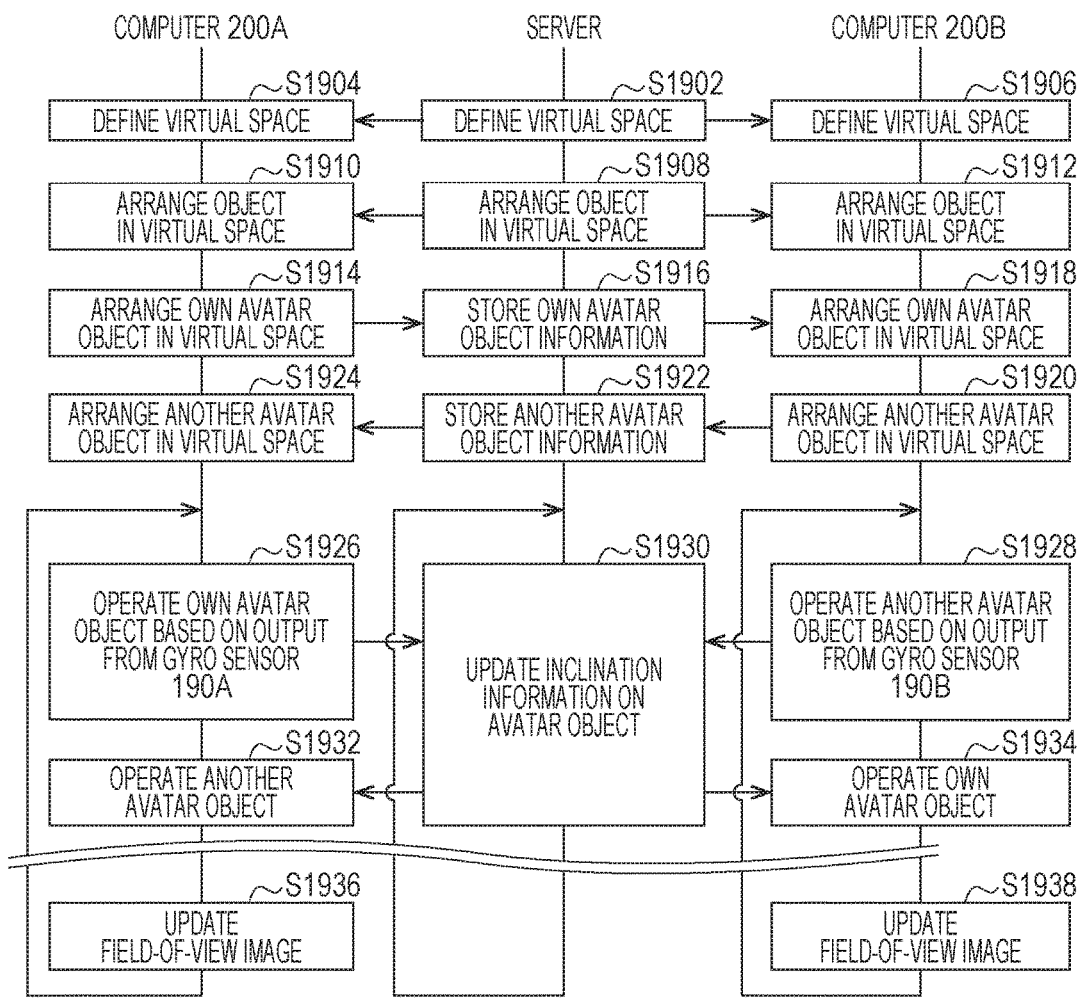
FIG. 19 A flowchart of exchange of signals between the computer and the server for translating a motion by the user in the real space in the avatar object according to at least one embodiment of this disclosure.

With reference to FIG. 19, a method of controlling operation of an avatar object in the virtual space is described. FIG. 19 is a flowchart of exchange of signals between the computer 200 and the server 600 for translating a motion by the user in the real space in the avatar object according to at least one embodiment of this disclosure. The processing illustrated in FIG. 19 may be implemented by the processor 210 of the computer 200 executing a control program stored in the memory 220 or the storage 230 and the processor 610 of the server 600 executing a control program stored in the storage 630.

In Step S1902, the processor 610 of the server 600 serves as the transmission/reception unit 1851 to transmit the virtual space designation information 1854 to the computers 200A and 200B based on requests for generating the virtual space, which are received from the computers 200A and 200B. At this time, each computer 200 may transmit identification information on the user 5 to the server 600 together with the virtual space designation information 1854. Then, the processor 610 may serve as the matching unit 1853 to associate pieces of identification information on the computers 200A and 200B with each other to establish the fact that the users 5A and 5B share the same virtual space.

In Step S1904, the processor 210A of the computer 200A serves as a virtual space definition module 1427A to define the virtual space 11A based on the received virtual space designation information 1854. In Step S1906, similarly to the processor 210A, the processor 210B of the computer 200B defines the virtual space 11B.

In Step S1908, the processor 610 outputs the object designation information 1855 for designating objects to be arranged in the virtual spaces 11A and 11B to the computers 200A and 200B.

In Step S1910, the processor 210A serves as a virtual object generation module 1428A to arrange objects in the virtual space 11A based on the received object designation information 1855. In Step S1912, the processor 210B arranges objects in the virtual space 11B similarly to the processor 210A.

In Step S1914, the processor 210A serves as an avatar control module 1431A to arrange the avatar object 6A (denoted by "own avatar object" in FIG. 22) of the user 5A himself or herself in the virtual space 11A. Then, the processor 210A transmits information (e.g., data for modeling and positional information) on the avatar object 6A to the server 600.

In Step S1916, the processor 610 stores the received information on the avatar object 6A into the storage 630 (avatar object information 1856). The processor 610 further transmits the information on the avatar object 6A to the computer 200B sharing the same virtual space with the computer 200A.

In Step S1918, the processor 210B serves as an avatar control module 1431B to arrange the avatar object 6A in the virtual space 11B based on the received information on the avatar object 6A.

Similarly to Step S1914 to Step S1918, in Step S1920 to Step S1924, the avatar object 6B is generated in the virtual spaces 11A and 11B (denoted by "another avatar object" in FIG. 22), and information on the avatar object 6B is stored in the storage 630.

In Step S1926, the processor 210A serves as the angular velocity detection module 1423A to detect the angular velocity about each axis of the HMD 120A based on the outputs from the gyro sensor 190A. The processor 210A also detects the inclination of the HMD 120A based on the angular velocity about each axis, and changes the inclination of the avatar object 6A arranged in the virtual space 11A so as to move together with this inclination. The processor 210A transmits to the server 600 motion detection data representing the detected angular velocity about each axis of the HMD 120A.

In Step S1928, the processor 210B changes, in the same manner as the processor 210A, the inclination of the avatar object 6B arranged in the virtual space 11B based on the outputs from the gyro sensor 190B. The processor 210B also transmits to the server 600 motion detection data corresponding to the outputs from the gyro sensor 190B.

In Step S1930, the processor 610 serves as the server processing unit 1852 to update the inclination information 1240 corresponding to the avatar object 6A based on the motion detection data received from the computer 200A. The processor 610 further updates the inclination information 1857 corresponding to the avatar object 6B based on the motion detection data received from the computer 200B.

In Step S1930, the processor 610 further serves as the transmission/reception unit 1851 to transmit the motion detection data from the computer 200A to the computer 200B. The processor 610 transmits the motion detection data received from the computer 200B to the computer 200A.

In Step S1932, the processor 210A changes the inclination of the avatar object 6B arranged in the virtual space 11A based on the received motion detection data. In Step S1934, the processor 210B changes the inclination of the avatar object 6A arranged in the virtual space 11B based on the received motion detection data.

In Step S1936, the processor 210A displays, on the monitor 130A, an image photographed by the virtual camera 14A arranged at the position of the eyes of the avatar object 6A. As a result, a field-of-view image recognized by the user 5A is updated. After that, the processor 210A returns the processing to Step S1926.

In Step S1938, similarly to the processor 210A, the processor 210B displays an image photographed by the virtual camera 14B on the monitor 130B. With this, a field-of-view image recognized by the user 5B is updated. After that, the processor 210B returns the processing to Step S1928.

In at least one embodiment of this disclosure, the processing of Step S1926 to S1938 is executed repeatedly at an interval of, e.g., 1/60 second or 1/30 second.

Through the above-mentioned series of processing steps, the user 5 is able to recognize a motion by another user in the real space via the avatar object of the other user in the virtual space 11.

In at least one aspect, the above-mentioned repeatedly executed processing includes processing of transmitting voices of the user 5 to the computer 200 of the partner and other processing of enhancing communication between users in the virtual space 11.

In at least the example described above, in Step S1914 and in Step S1920, the computer 200 arranges the own avatar object of the user in the virtual space 11. In at least one aspect, the processing in Step S1914 and in Step S1920 is omitted because the user is able to communicate to/from a partner as long as the avatar object of the partner is arranged in the virtual space 11.

[Rotation of Head Together with Body when Rotating Head]

Figure 20:
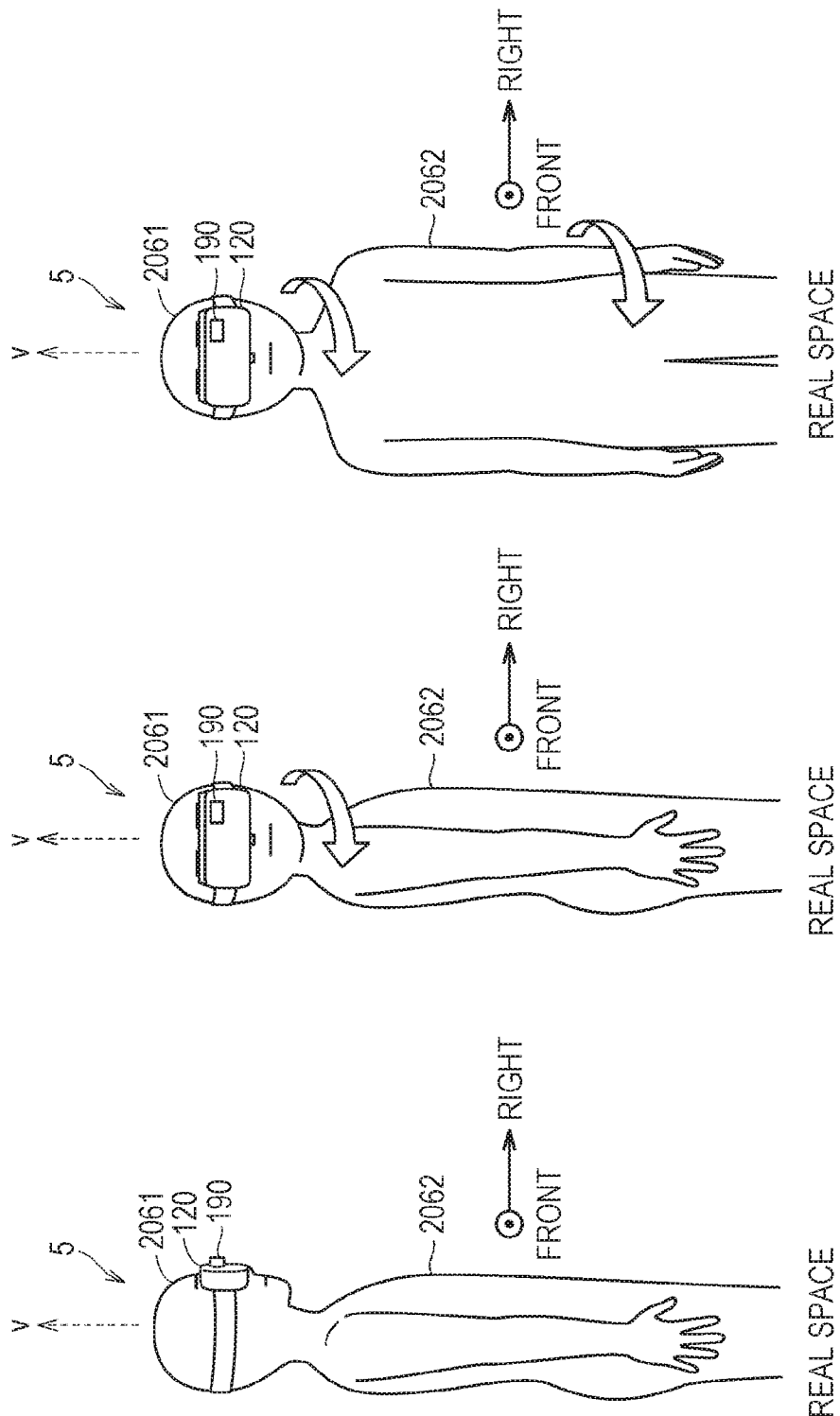
FIG. 20A A diagram of a case in which a motion by the user in the real space is not tracked correctly according to at least one embodiment of this disclosure.
FIG. 20B A diagram of a case in which a motion by the user in the real space is not tracked correctly according to at least one embodiment of this disclosure.
FIG. 20C A diagram of a case in which a motion by the user in the real space is not tracked correctly according to at least one embodiment of this disclosure.

FIG. 20A to FIG. 20C are diagrams of a case in which a motion by the user 5 in the real space is not tracked correctly according to at least one embodiment of this disclosure. In FIG. 20A, a head 2061 and a body 2062 of the user 5 are facing to the right. In FIG. 20B, the head 2061 of the user 5 is facing the front, and the body 2062 is facing to the right. In FIG. 20C, the head 2061 and the body 2062 of the user 5 are facing the front.

In at least one aspect, the user 5 transitions from the state of FIG. 20A to the state of FIG. 20B, namely, rotates his/her head 2061 (twists the neck) without moving the body 2062. In this case, the gyro sensor 190 included in the HMD 120 detects the angular velocity (i.e., voltage value corresponding to the angular velocity) about the yaw axis (v axis). In at least one aspect, the user 5 transitions from the state of FIG. 20A to the state of FIG. 20C, namely, rotates his/her head 2061 together with rotating his/her body 2062 (i.e., moves his/her whole body). In this case as well, the gyro sensor 190 detects the angular velocity about the yaw axis.

As described above, the gyro sensor 190 detects only the motion by the head 2061 of the user 5, and does not detect the motion by the body 2062. Therefore, a related-art computer is unable to determine, when the gyro sensor 190 detects the angular velocity about the yaw axis, whether the user 5 has transitioned from the state of FIG. 20A to the state of FIG. 20B, or from the state of FIG. 20A to the state of FIG. 20C. When performing this determination in a related-art computer, a new device for tracking the motion by the body 2062 is used. However, due to cost and location problems, adding such new devices is difficult, in some instances.

Therefore, in at least one embodiment of this disclosure, the rotation control module 1432 of the computer 200 performs the above-mentioned determination relating to the state transition based on the angular velocity about the yaw axis detected by the gyro sensor 190. This control is now described in more detail.

Normally, the rotation speed of the head when rotating the head without rotating the body (i.e., when transitioning from state of FIG. 20A to state of FIG. 20B) is faster than the rotation speed of the head when rotating the head together with the body (i.e., when transitioning from state of FIG. 20A to state of FIG. 20C). The rotation control module 1432 utilizes this property to perform the above-mentioned determination regarding the state transition.

As an example, when the angular velocity about the yaw axis detected by the gyro sensor 190 is equal to or more than a threshold value (e.g., 360 degrees/sec), the rotation control module 1432 may determine that the user 5 has rotated his/her head without rotating his/her body. On the other hand, when the angular velocity is less than that threshold value, the rotation control module 1432 may determine that the user 5 has rotated his/her head together with his/her body.

Figure 21:
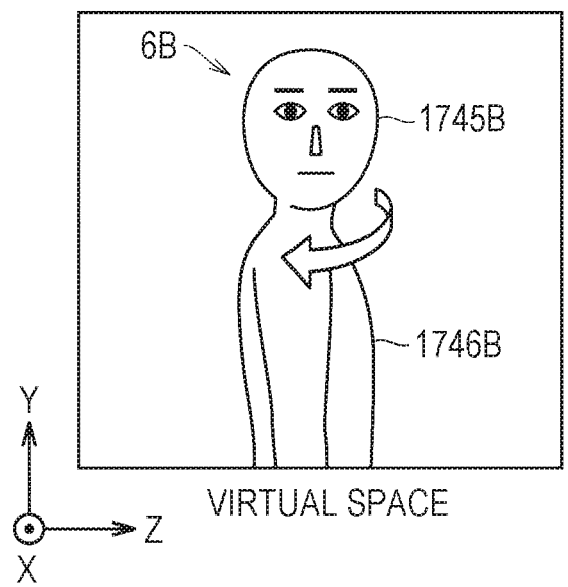
FIG. 21 A diagram of processing of a motion by an avatar object in a case where an angular velocity about a yaw axis is equal to or more than a threshold value according to at least one embodiment of this disclosure.
Figure 22:
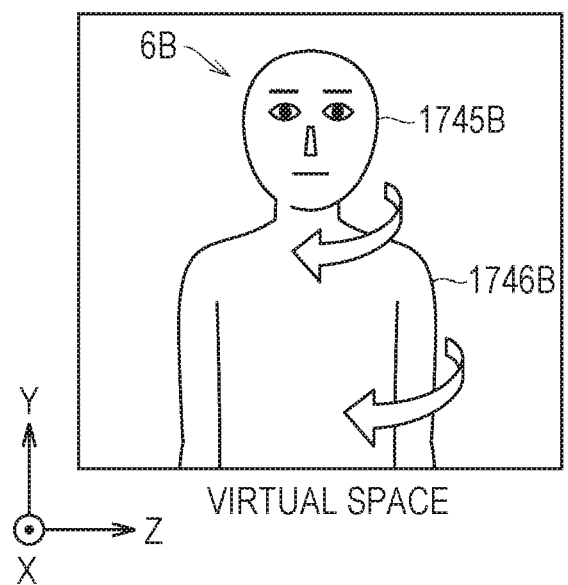
FIG. 22 A diagram of processing of a motion by an avatar object in a case where the angular velocity about the yaw axis is less than the threshold value according to at least one embodiment of this disclosure.

FIG. 21 is a diagram of processing of a motion by the avatar object 6B in a case where the angular velocity about the yaw axis is equal to or more than the threshold value according to at least one embodiment of this disclosure. FIG. 22 is a diagram of processing of a motion by the avatar object 6B in a case where the angular velocity about the yaw axis is less than the threshold value according to at least one embodiment of this disclosure.

In at least one aspect, the computer 200A receives from the computer 200B via the server 600 information (motion detection data) representing the angular velocity about the yaw axis detected by the gyro sensor 190B. In response to a determination that the angular velocity is equal to or more than the threshold value, as in FIG. 21, the computer 200A rotates the head 1745B in accordance with the angular velocity without rotating the body 1746B of the avatar object 6B. On the other hand, in response to a determination that the angular velocity is less than the threshold value, as in FIG. 22, the computer 200A rotates the head 1745B together with the body 1746B of the avatar object 6B in accordance with the angular velocity. As a result, the user 5A is able to recognize the accurate motion by the user 5B in the real space by visually recognizing the motion by the avatar object 6B arranged in the virtual space 11A.

[Control Flow]

Figure 23:
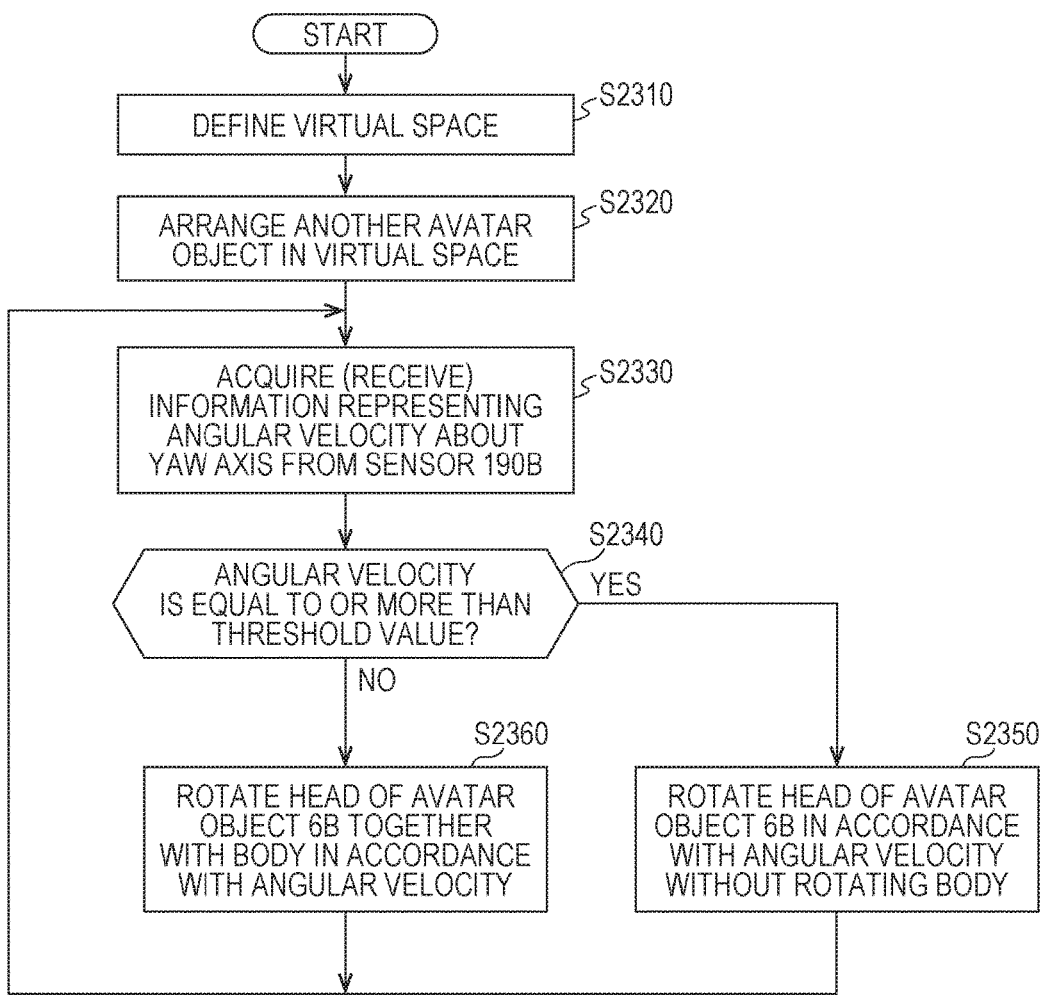
FIG. 23 A flowchart of processing in which the computer controls a motion by the avatar object corresponding to the user according to at least one embodiment of this disclosure.

Now, with reference to FIG. 23, a description is given of the above-mentioned series of control steps for determining whether or not the head and the body are to be moved together when rotating the head of the avatar object. FIG. 23 is a flowchart of processing in which the computer 200A controls the motion by the avatar object 6B corresponding to the user 5B according to at least one embodiment of this disclosure. The processing in FIG. 23 may be implemented by the processor 210 of the computer 200 executing a control program stored in the memory 220 or the storage 230.

In Step S2310, the processor 210A defines the virtual space 11 based on the virtual space designation information 1854 received from the server 600.

In Step S2320, the processor 210A arranges the avatar object 6B in the virtual space 11A based on the information on the avatar object 6B received from the computer 200B via the server 600.

In Step S2330, the processor 210A receives from the computer 200B via the server 600 information (motion detection data) representing the angular velocity about the yaw axis detected by the gyro sensor 190B.

In Step S2340, the processor 210A determines, as the rotation control module 1432A, whether or not the angular velocity about the yaw axis is equal to or more than a threshold value determined in advance (e.g., 360 degrees/sec). The threshold value may be stored in advance in the storage 230. In response to a determination that the angular velocity is equal to or more than the threshold value (YES in Step S2340), the processor 210A advances the processing to Step S2350. On the other hand, in response to a determination that the angular velocity is less than the threshold value (NO in Step S2340), the processor 210A advances the processing to Step S2360.

In Step S2350, the processor 210A rotates the head 1745B about the yaw axis in accordance with the angular velocity without rotating the body 1746B of the avatar object 6B. Then, the processor 210A returns the processing to Step S2330.

In Step S2360, the processor 210A rotates the head 1745B about the yaw axis in accordance with the angular velocity together with rotating the body 1746B of the avatar object 6B. Then, the processor 210A returns the processing to Step S2330.

In the above description, the computer 200 in at least one embodiment of this disclosure determines, even when the computer 200 does not have a device for tracking the motion by the body of the user, whether the head of the user is rotating together with the body or whether the head of the user is rotating without the body rotating. This enables the computer 200 to accurately translate the motion by the user in the avatar object. As a result, the user may communicate to/from another user sharing the virtual space more smoothly via an avatar object that reproduces the motion by the other user more accurately.

In the example described above, the rotation control module 1432 is configured to determine whether or not the head and the body of the avatar object are to be rotated together based on whether or not an angular velocity is equal to or more than a threshold value. In at least one aspect, the rotation control module 1432 is configured to determine whether or not the head and the body of the avatar object are to be rotated together based on whether or not an angular acceleration about the yaw axis is equal to or more than a threshold value.

[Control Using Hand Tracking Information]

In the above example, the computer 200 is configured to determine whether or not the head and the body of the avatar object are to be rotated together based only on the angular velocity about the yaw axis. However, there is a risk that the computer 200 erroneously detects the motion by the user, for example, when the user rotates his/her head very quickly while also rotating his/her body. Therefore, a control method for suppressing such an erroneous detection is now described with reference to FIG. 24 to FIG. 26.

Figure 24:
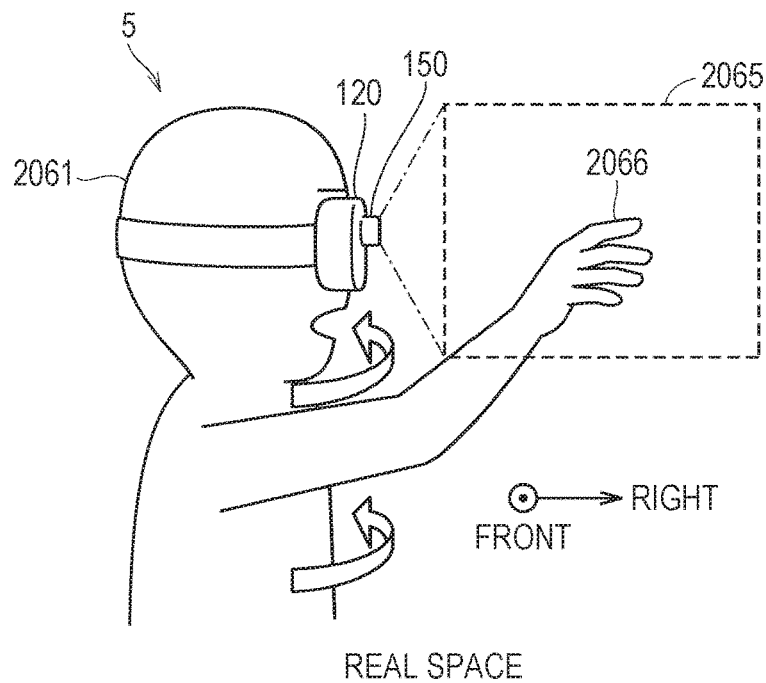
FIG. 24 A diagram of a motion by a hand at a time when a head moves together with a body according to at least one embodiment of this disclosure.

FIG. 24 is a diagram of a motion by a hand at a time when the head 2061 moves together with the body 2062 according to at least one embodiment of this disclosure. In FIG. 24, there is a state in which the user 5 has rotated his/her head 2061 together with his/her body 2062 in the right direction as viewed from the front. At this time, a hand 2066 of the user 5 is usually rotated in the right direction as viewed from the front together with the body 2062. Therefore, during the time that the user 5 is rotating, there is a high likelihood that the hand 2066 is always included in a space 2065 from which the first camera 150 arranged in the HMD 120 is able to acquire depth information. In other words, during the time that the head 2061 is rotating together with the body 2062, there is a high likelihood that the computer 200 is able to track the position of the hand 2066 of the user 5.

Figure 25:
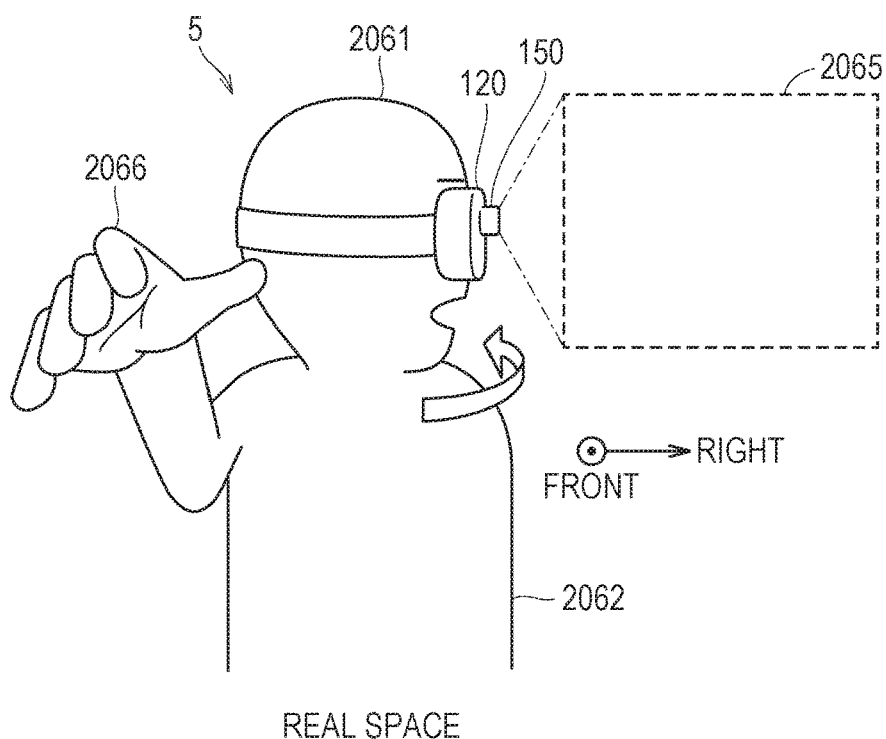
FIG. 25 A diagram of a motion by a hand at a time when the head does not move together with the body according to at least one embodiment of this disclosure.

FIG. 25 is a diagram of a motion by a hand at a time when the head 2061 moves, but the body 2062 does not move together with the head 2061 according to at least one embodiment of this disclosure. In FIG. 25, there is a state in which the user 5 rotates his/her head 2061 in the right direction as viewed from the front, without rotating the body 2062 therewith. At this time, the hand 2066 of the user 5 normally remains in front, and like the body 2062, is not rotated. Therefore, when the head 2061 of the user 5 rotates, there is a high likelihood that the hand 2066 is outside the space 2065. In other words, when the head 2061 rotates but the body 2062 does not, there is a high likelihood that the computer 200 can no longer track the position of the hand 2066 of the user 5.

The computer 200 in at least one embodiment of this disclosure uses the above-mentioned property to determine whether or not the head and the body of the avatar object are to be rotated together. More specifically, when the computer 200 is able to track the position of the hand 2066 of the user 5 (when the first camera 150 is acquiring depth information on the hand 2066), the computer 200 rotates the head of the avatar object in accordance with the angular velocity about the yaw axis detected by the gyro sensor 190 together with the body. On the other hand, when the computer 200 fails to track the position of the hand 2066, the computer 200 rotates the head of the avatar object in accordance with the angular velocity about the yaw axis, and does not rotate the body.

Figure 26:
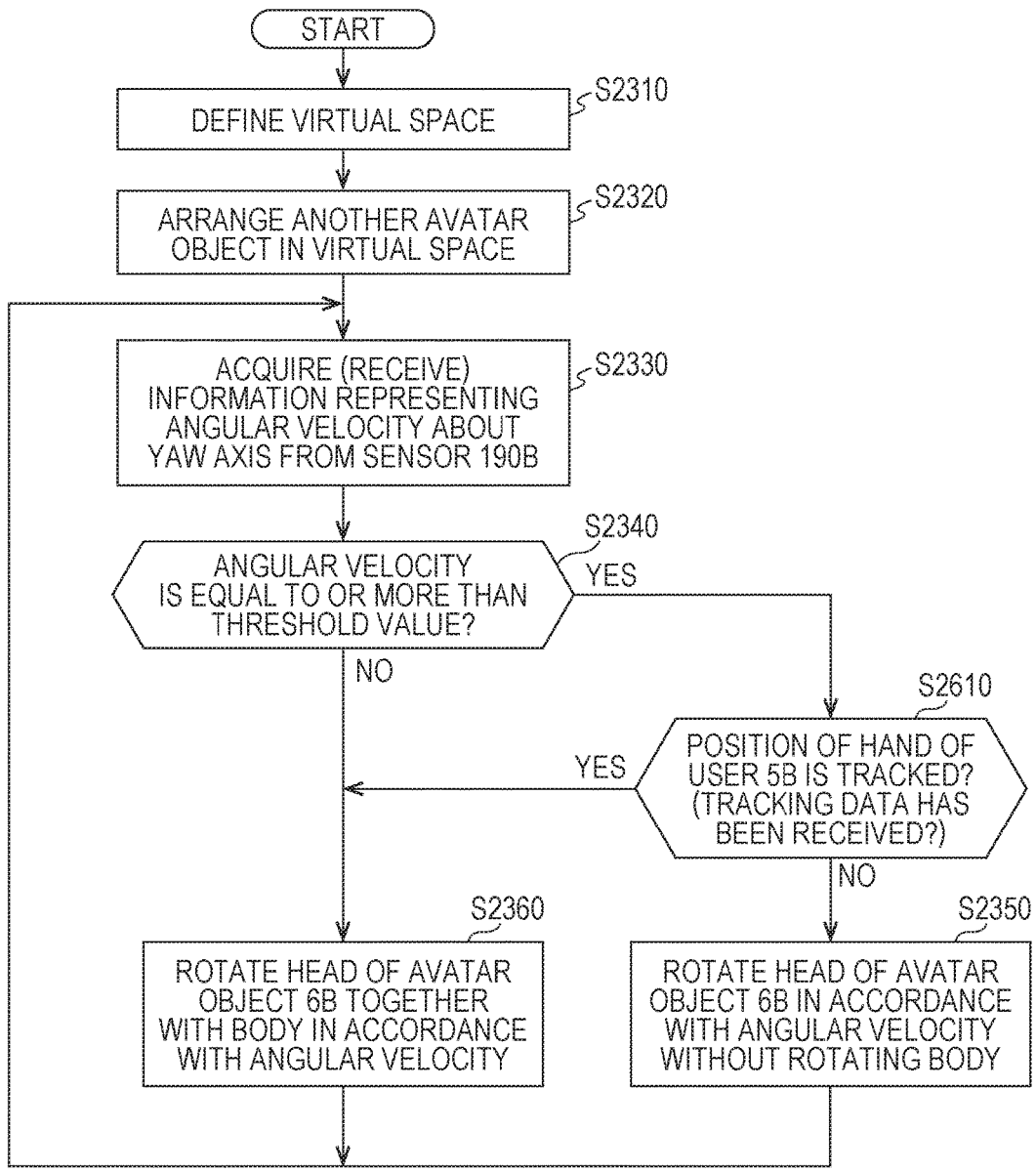
FIG. 26 A flowchart of processing in which the computer controls a motion by the avatar object by using hand tracking information according to at least one embodiment of this disclosure.

FIG. 26 is a flowchart of processing in which the computer 200A controls the motion by the avatar object 6B by using the hand tracking information according to at least one embodiment of this disclosure. Processing denoted by the same reference numerals as in FIG. 23 is the same processing as in FIG. 23, and hence a description of that processing is not repeated here.

In Step S2340, in response to a determination that that the angular velocity about the yaw axis of the HMD 120B received from the computer 200B via the server 600 is equal to or more than a predetermined threshold value (YES in Step S2340), the processor 210A advances the processing to Step S2610.

In Step S2610, the processor 210A determines whether or not the position of the hand of the user 5B is tracked. When the processor 210A is receiving information (tracking data) representing the position of the hand of the user 5B from the computer 200B via the server 600, the processor 210A may determine that the position of the hand of the user 5B is tracked.

In at least one aspect, when the hand of the user 5B is outside the range within which the first camera 150B is capable of acquiring depth information, the computer 200B outputs a signal to the computer 200A informing the user of that fact. The processor 210A may also determine, when that signal has been received, that the position of the hand of the user 5B can no longer be tracked.

In response to a determination that the position of the hand of the user 5B is tracked (YES in Step S2610), the processor 210A advances the processing to Step S2350. On the other hand, in response to a determination that the position of the hand of the user 5B is not tracked (NO in Step S2610), the processor 210A advances the processing to Step S2360.

As described above, the computer 200 in at least one embodiment of this disclosure is configured to determine whether or not the head and the body of the avatar object are to be rotated together by using hand tracking information in addition to the angular velocity about the yaw axis. Therefore, the computer 200 may suppress the erroneous detection of the motion by the user.

In at least one aspect, the computer 200 is configured to determine whether or not the head and the body of the avatar object are to be rotated together based only on hand tracking information. In this case, the computer 200 may omit the processing of Step S2340 in FIG. 26, and advance the processing from Step S2330 to Step S2610.

[Control Based on Rotation Angle]

In at least the embodiment described above, the computer 200 is configured to determine, in accordance with the angular velocity about the yaw axis of the head of the user, whether or not the head and the body of the avatar object are to be rotated together. The computer 200 in at least one embodiment of this disclosure performs this determination in accordance with a rotation angle, and not the angular velocity.

Now, a description is given of an outline of the above-mentioned determination control in the computer 200 in at least one embodiment. When the user 5 (person) tries to see an object arranged at a position having a yaw angle $\theta v1$ from the state in which the user 5 is facing the front (state in which the neck is not twisted), the user may determine, in accordance with the yaw angle $\theta v1$, whether to only rotate the head or whether to rotate the whole body. Specifically, when the yaw angle $\theta v1$ is large (e.g., 60 degrees or more), the user 5 may visually recognize an object by rotating his/her whole body (rotating head and body together). When the yaw angle $\theta v1$ is small (e.g., less than 60 degrees), the user 5 is able to visually recognize the object by rotating only his/her head (rotating head but not rotating body).

Utilizing the above-mentioned property, the computer 200 in at least one embodiment rotates, in response to a determination that the rotation angle about the yaw axis of the head of the user 5 relative to a reference state (state in which the neck is not twisted) is less than a threshold value (e.g., 60 degrees), the head of the avatar object without rotating the body. When the rotation angle is equal to or more than the threshold value, the computer 200 rotates the head and the body of the avatar object together. Now, a description is given of a specific configuration and control of the computer 200 in at least one embodiment.

Figure 27:
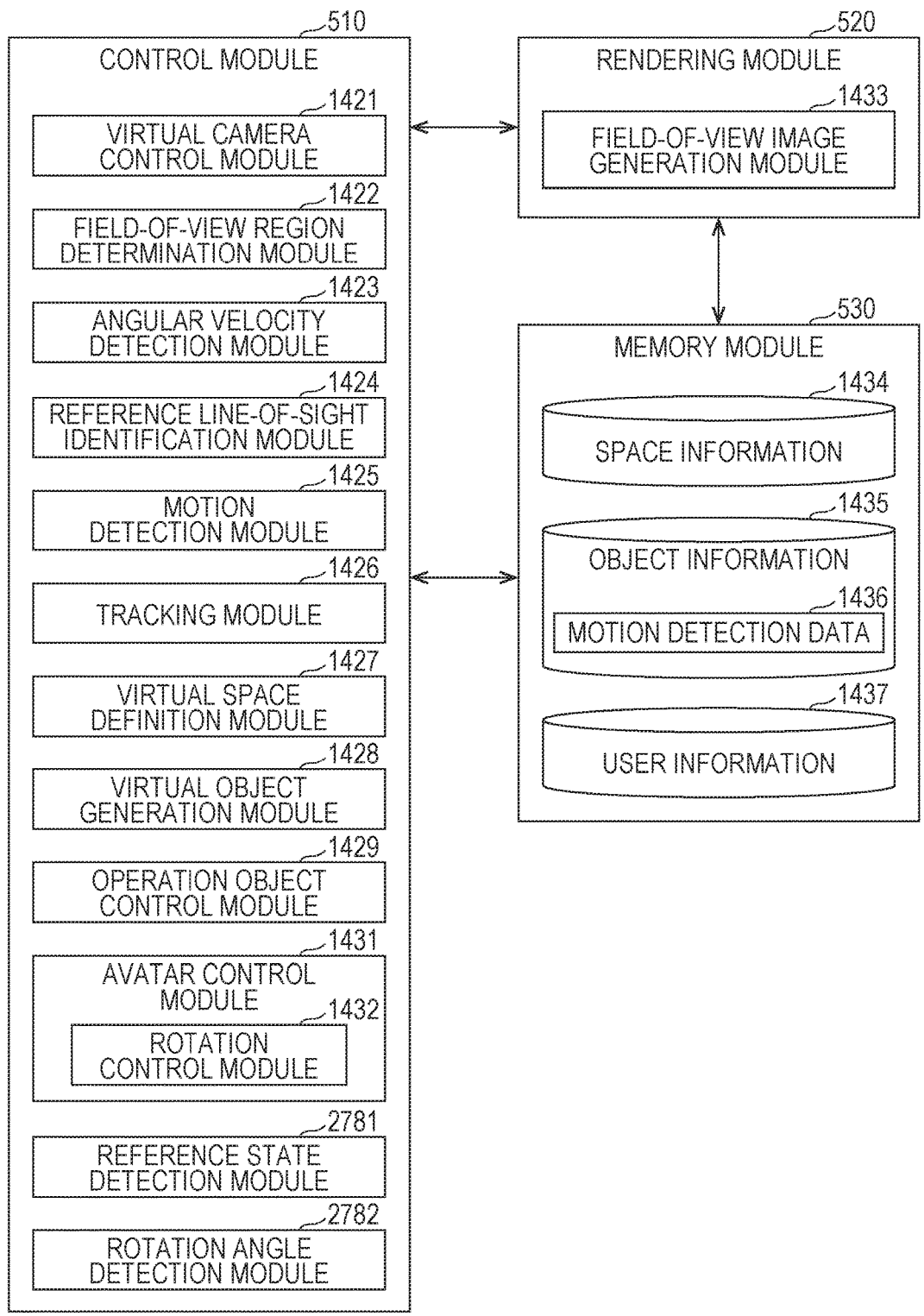
FIG. 27 A block diagram of a detailed configuration of modules of a computer according to at least one embodiment of this disclosure.

FIG. 27 is a block diagram of a module configuration of the computer 200 according to at least one embodiment of this disclosure. Parts denoted by the same reference numerals as in FIG. 14 represent the same devices or modules in FIG. 14, and hence a description of those parts is not repeated here. The hardware configuration of the computer 200 in at least one embodiment is the same as the hardware configuration illustrated in FIG. 2.

In addition to the configuration in FIG. 14, the computer 200 in at least one embodiment further includes a reference state detection module 2781 and a rotation angle detection module 2782.

The reference state detection module 2781 detects a state (hereinafter also referred to as "reference state") in which the user 5 is estimated as not twisting his/her neck. The reference state detection module 2781 stores a yaw angle (hereinafter also referred to as "reference angle") $\theta vs$ of the HMD 120 in the reference state in the memory 11. As one example, the reference state detection module 2781 detects a state in which the head of the user 5 is substantially stationary for a period (e.g., 5 seconds) determined in advance as the reference state. The reference state detection module 2781 is able to determine that the head of the user 5 is substantially stationary when the angular velocity about the yaw axis detected by the gyro sensor 190 is less than a threshold value (e.g., 10 degrees/sec). Usually, the user 5 (person) does not maintain a twisted state for a long duration.

The rotation angle detection module 2782 calculates the rotation angle relative to the reference angle $\theta vs$. More specifically, the rotation angle detection module 2782 calculates, based on the angular velocity about the yaw axis detected by the gyro sensor 190, a yaw angle $\theta v$ at that time, and then calculates the difference between the yaw angle θv and the reference angle θvs as the rotation angle relative to the reference angle θvs.

Figure 28:
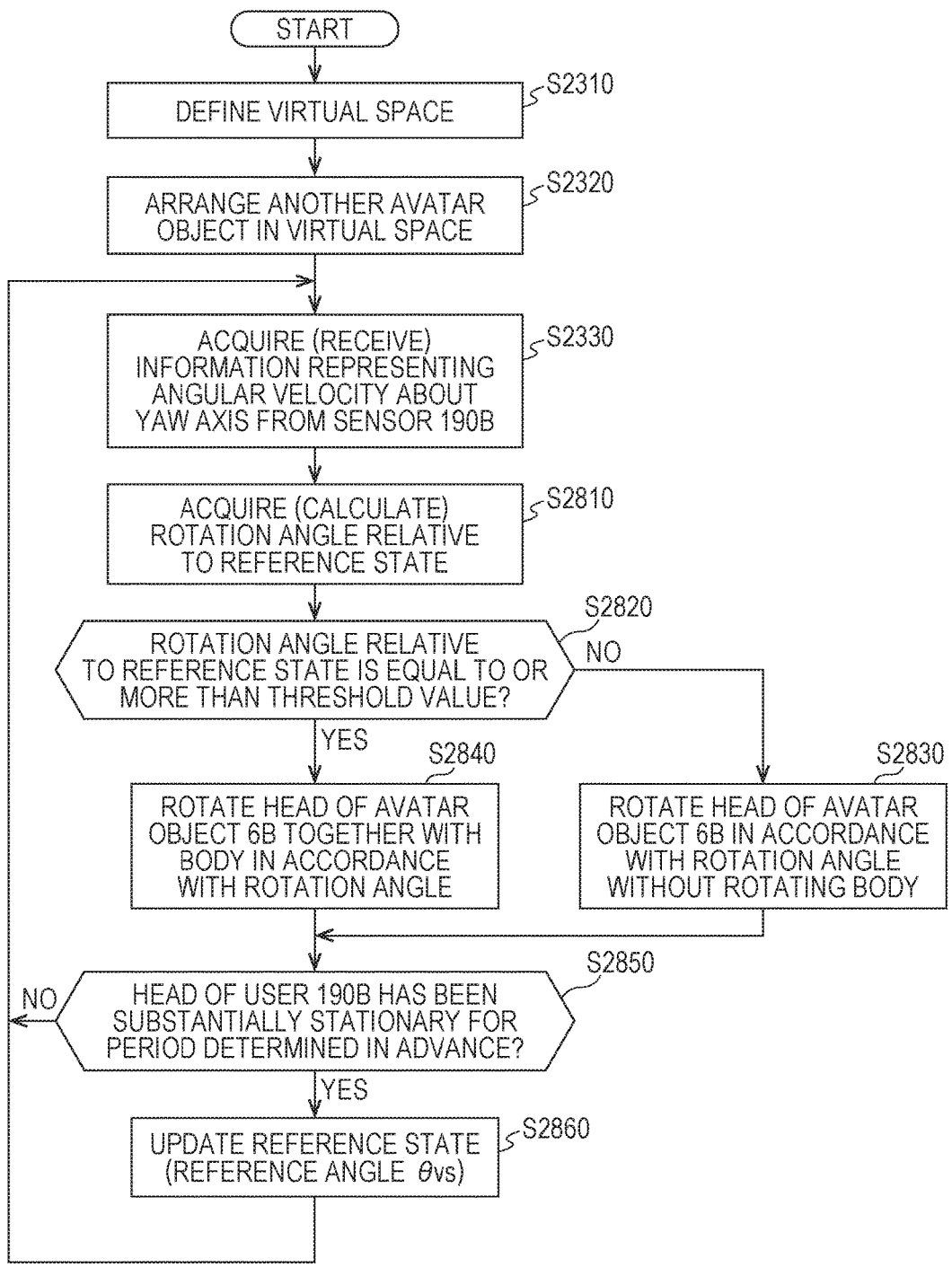
FIG. 28 A flowchart of processing in which the computer controls a motion by the avatar object corresponding to the user according to at least one embodiment of this disclosure.

FIG. 28 is a flowchart of processing in which the computer 200A controls the motion by the avatar object 6B corresponding to the user 5B according to at least one embodiment of this disclosure. Processing denoted by the same reference numerals as in FIG. 23 is the same processing as in FIG. 23, and hence a description of that processing is not repeated here.

In Step S2810, the processor 210A serves as the rotation angle detection module 2782A to calculate the rotation angle relative to the reference state (reference angle θvs stored in memory 220A) based on the angular velocity about the yaw axis received from the computer 200B.

In Step S2820, the processor 210A determines whether or not the rotation angle relative to the reference state (reference angle θvs) is equal to or more than a threshold value (e.g., 60 degrees). In response to a determination that the rotation angle relative to the reference state is less than the threshold value (NO in Step S2820), the processor 210 advances the processing to Step S2830. On the other hand, in response to a determination that the rotation angle is equal to or more than the threshold value (YES in Step S2820), the processor 210 advances the processing to Step S2840.

In Step S2830, the processor 210A rotates, in accordance with the rotation angle relative to the reference state, the head 1745B about the yaw axis without rotating the body of the avatar object 6B. Then, the processor 210A advances the processing to Step S2850.

In Step S2840, the processor 210A rotates the head 1745B of the avatar object 6B about the yaw axis together with the body 1746B in accordance with the rotation angle relative to the reference state.

In Step S2850, the processor 210A serves as the reference state detection module 2781A to determine, based on the angular velocity about the yaw axis received from the computer 200B, whether or not the head of the user 5B has been substantially stationary for a period determined in advance.

In response to a determination that the head of the user 5B has been substantially stationary for the period determined in advance (YES in Step S2850), the processor 210A advances the processing to Step S2860. On the other hand, in response to a determination that the head of the user 5B has not been substantially stationary for the period determined in advance (NO in Step S2850), the processor 210A returns the processing to Step S2330.

In Step S2860, the processor 210A stores in the memory 220 the yaw angle θv of the avatar object 6B at that point as the reference angle θvs. As a result, the reference state (reference angle θvs) is updated.

As described above, the computer 200 in at least one embodiment is able to determine, based on the rotation angle about the yaw axis of the head of another user using another computer 200 relative to a reference state of the another user, whether or not the head and the body of the avatar object corresponding to the another user are to be rotated together. The computer 200 of such at least one embodiment is also able to accurately translate in the avatar object the motion by the user.

In at least one aspect, the computer 200 in at least one embodiment is able to apply the above-mentioned control for suppressing erroneous detection of the motion by the user in which hand tracking information is used to the above-mentioned motion control of the avatar object based on the rotation angle.

One of ordinary skill in the art would understand that the embodiments disclosed herein are merely examples in all aspects and in no way intended to limit this disclosure. The scope of this disclosure is defined by the appended claims and not by the above description, and this disclosure encompasses all modifications made within the scope and spirit equivalent to those of the appended claims.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the hand of the user.

What is claimed is:

1. A method, comprising:
   defining a virtual space associated with a user,
     the virtual space comprising an avatar object associated with the user,
     the avatar object comprising a head and a body;
   acquiring, in response to a detected rotation of a head of the user, information representing an angular velocity of the detected rotation;
   determining whether the angular velocity is equal to or greater than a threshold value;
   rotating, in response to a determination that the angular velocity is equal to or greater than the threshold value, the head of the avatar object without rotating the body of the avatar object; and
   rotating, in response to a determination that the angular velocity is less than the threshold value, the head of the avatar object together with the body of the avatar object.

2. The method according to claim 1, further comprising:
   defining a detection region in a real space for detecting a position of a hand of a user; and
   identifying whether the hand of the user is located within the detection region.

3. The method according to claim 2, further comprising:
   rotating, in response to identifying that the hand of the user is outside of the detection region, the head of the avatar object without rotating the body of the avatar object.

4. The method according to claim 1, further comprising:
   receiving a signal from a sensor arranged in a head-mounted device associated with the user;
   identifying a component, which is included in the signal, and which corresponds to an angular velocity of the detected rotation about an axis determined in advance; and acquiring, based on the component, information representing the angular velocity.

5. The method according to claim 1, further comprising:
determining a duration that the head of the user has been stationary; and
identifying a direction in which the head of the user is facing in response to a determination that the duration exceeds a duration threshold value.

6. The method according to claim 5, further comprising moving the body of the avatar object to face the identified direction, in response to the duration exceeding the duration threshold value and the identified direction being different from a direction which the body of the avatar object is facing.

7. The method according to claim 3, wherein the rotating of the head of the avatar object comprises rotating the head of the avatar object in a direction of a most recent detected location of the hand of the user.

8. The method according to claim 7, wherein the rotating of the head of the avatar object comprises rotating the head of the avatar object independent of the detected head rotation of the user.

9. A method, comprising:
defining a virtual space associated with a user,
the virtual space comprising an avatar object associated with the user,
the avatar comprising a head and a body;
detecting a first direction to serve as a reference direction of a head of the user;
detecting rotation of the head of the user to a second direction different from the first direction;
identifying a rotation angle between the second direction and the first direction;
determining whether the rotation angle is less than a threshold value;
rotating, in response to a determination that the rotation angle is less than the threshold value, the head of the avatar object without rotating the body of the avatar object; and
rotating, in response to a determination that the rotation angle is equal to or more than the threshold value, the head of the avatar object together with the body of the avatar object.

10. The method according to claim 9, further comprising:
defining a detection region in a real space for detecting a position of a hand of a user; and
identifying whether the hand of the user is located within the detection region.

11. The method according to claim 10, further comprising:
rotating, in response to a determination that the hand of the user is not located within the detection region, the head of the avatar object without rotating the body of the avatar object.

12. The method according to claim 9, further comprising:
determining whether the head of the user has been stationary for a duration determined in advance; and
identifying a direction in which the head of the user is facing in the stationary state for the duration determined in advance as the first direction.

13. The method according to claim 9, further comprising:
receiving a signal from a sensor arranged in a head-mounted device (HMD) associated with the user;
identifying a component, which is included in the signal, and which corresponds to a direction of the HMD; and
identifying the second direction based on the component.

14. The method according to claim 12, further comprising moving the body of the avatar object to face the identified direction, in response to the head of the user being stationary for a time period greater than the duration determined in advance and the identified direction being different from a direction which the body of the avatar object is facing.

15. The method according to claim 11, wherein the rotating of the head of the avatar object comprises rotating the head of the avatar object in a direction of a most recent detected location of the hand of the user.

16. The method according to claim 15, wherein the rotating of the head of the avatar object comprises rotating the head of the avatar object independent of the detected head rotation of the user.

17. An apparatus comprising:
a non-transitory computer readable medium configured to store a program thereon; and
a processor connected to the non-transitory computer readable medium, wherein the processor is configured to execute the program for:
defining a virtual space associated with a user,
the virtual space comprising an avatar object associated with the user,
the avatar object comprising a head and a body;
acquiring, in response to a detected rotation of a head of the user, information representing an angular velocity of the detected rotation;
determining whether the angular velocity is equal to or greater than a threshold value;
rotating, in response to a determination that the angular velocity is equal to or greater than the threshold value, the head of the avatar object without rotating the body of the avatar object; and
rotating, in response to a determination that the angular velocity is less than the threshold value, the head of the avatar object together with the body of the avatar object.

18. The apparatus according to claim 17, wherein the processor is further configured to execute the program for:
defining a detection region in a real space for detecting a position of a hand of a user; and
identifying whether the hand of the user is located within the detection region.

19. The apparatus according to claim 18, wherein the processor is further configured to execute the program for:
rotating, in response to a determination that the hand of the user is not within the detection region, the head of the avatar object without rotating the body of the avatar object.

20. The apparatus according to claim 18, being a head-mounted device, wherein the processor is further configured to execute the program for rotating, in response to a determination that the hand of the user is not within the detection region, the head of the avatar object in a direction of a most recent detected location of the hand of the user.

* * * * *